US008612090B2

(12) United States Patent
Nielsen et al.

(10) Patent No.: US 8,612,090 B2
(45) Date of Patent: *Dec. 17, 2013

(54) METHODS, APPARATUS, AND SYSTEMS FOR ACQUIRING AND ANALYZING VEHICLE DATA AND GENERATING AN ELECTRONIC REPRESENTATION OF VEHICLE OPERATIONS

(75) Inventors: Steven Nielsen, North Palm Beach, FL (US); Curtis Chambers, Palm Beach Gardens, FL (US); Jeffrey Farr, Tequesta, FL (US)

(73) Assignee: CertusView Technologies, LLC, Palm Beach Gardens, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/568,932

(22) Filed: Aug. 7, 2012

(65) Prior Publication Data

US 2013/0116855 A1    May 9, 2013

Related U.S. Application Data

(63) Continuation of application No. 12/753,699, filed on Apr. 2, 2010, now Pat. No. 8,260,489.

(60) Provisional application No. 61/166,385, filed on Apr. 3, 2009, provisional application No. 61/166,392, filed on Apr. 3, 2009.

(51) Int. Cl.
*G07C 5/12* (2006.01)

(52) U.S. Cl.
USPC .............................. 701/32.2; 701/32.3; 705/4

(58) Field of Classification Search
USPC .............. 701/29.1, 29.6, 31.4, 32.2, 32.3, 33; 705/4
See application file for complete search history.

(56) References Cited

U.S. PATENT DOCUMENTS

| 6,018,980 | A  | * | 2/2000 | Kimura et al. ............... 73/12.04 |
| 6,704,644 | B1 | * | 3/2004 | Kobayashi et al. ........... 701/410 |
| 6,823,258 | B2 | * | 11/2004 | Ukai et al. ....................... 705/4 |
| 7,660,725 | B2 | * | 2/2010 | Wahlbin et al. .................. 705/4 |
| 7,818,187 | B2 | * | 10/2010 | Wahlbin et al. .................. 705/4 |
| 7,890,353 | B2 | * | 2/2011 | Wahlbin et al. .................. 705/4 |
| 8,218,827 | B2 |   | 7/2012 | Nielsen et al. |
| 8,260,489 | B2 |   | 9/2012 | Nielsen et al. |
| 8,311,765 | B2 |   | 11/2012 | Nielsen et al. |
| 2003/0046003 | A1 |   | 3/2003 | Smith et al. |
| 2005/0129324 | A1 |   | 6/2005 | Lemke |

(Continued)

OTHER PUBLICATIONS

Office Action dated Dec. 12, 2012 from U.S. Appl. No. 12/753,687.

(Continued)

*Primary Examiner* — Joseph Rocca
*Assistant Examiner* — Timothy Wilhelm

(57) ABSTRACT

Geo-referenced and/or time-referenced electronic drawings may be generated based on electronic vehicle information to facilitate documentation of a vehicle-related event. A symbols library, a collection of geo-referenced images, and any data acquired from one or more vehicles may be stored in memory for use in connection with generation of such drawings, and a drawing tool graphical user interface (GUI) may be provided for electronically processing vehicle data and geo-referenced images. Processed geo-referenced images may be saved as event-specific images, which may be integrated into, for example, an electronic vehicle accident report for accurately depicting a vehicle accident.

89 Claims, 16 Drawing Sheets

(56) References Cited

U.S. PATENT DOCUMENTS

| | | | |
|---|---|---|---|
| 2006/0031103 A1* | 2/2006 | Henry | 705/4 |
| 2006/0242418 A1 | 10/2006 | Willamowski | |
| 2007/0044539 A1 | 3/2007 | Sabol et al. | |
| 2010/0088164 A1 | 4/2010 | Nielsen et al. | |
| 2010/0090700 A1 | 4/2010 | Nielsen et al. | |
| 2010/0090858 A1 | 4/2010 | Nielsen et al. | |
| 2010/0094553 A1 | 4/2010 | Nielsen et al. | |
| 2010/0117654 A1 | 5/2010 | Nielsen et al. | |
| 2010/0256891 A1 | 10/2010 | Weiss et al. | |
| 2010/0257477 A1 | 10/2010 | Nielsen et al. | |
| 2011/0093162 A1 | 4/2011 | Nielsen et al. | |
| 2011/0093304 A1 | 4/2011 | Nielsen et al. | |
| 2011/0093306 A1 | 4/2011 | Nielsen et al. | |
| 2011/0117272 A1 | 5/2011 | Nielsen et al. | |
| 2011/0249394 A1 | 10/2011 | Nielsen et al. | |
| 2011/0282542 A9 | 11/2011 | Nielsen et al. | |
| 2012/0274476 A1 | 11/2012 | Nielsen et al. | |
| 2012/0328162 A1 | 12/2012 | Nielsen et al. | |
| 2012/0330849 A1 | 12/2012 | Nielsen et al. | |
| 2013/0002854 A1 | 1/2013 | Nielsen et al. | |
| 2013/0006718 A1 | 1/2013 | Nielsen et al. | |
| 2013/0044918 A1 | 2/2013 | Nielsen et al. | |
| 2013/0085670 A1 | 4/2013 | Nielsen et al. | |
| 2013/0101180 A1 | 4/2013 | Nielsen et al. | |
| 2013/0103318 A1 | 4/2013 | Nielsen et al. | |
| 2013/0125042 A1 | 5/2013 | Nielsen et al. | |
| 2013/0135343 A1 | 5/2013 | Nielsen et al. | |

OTHER PUBLICATIONS

Office Action dated Dec. 20, 2012 from U.S. Appl. No. 12/753,664.
International Search Report and Written Opinion, Application No. PCT/US2010/000997, Jun. 15, 2010.
International Search Report and Written Opinion, Application No. PCT/US2010/000998, Jun. 29, 2010.
Notice of Allowance dated May 8, 2012 from U.S. Appl. No. 12/753,699.
Office Action dated Jul. 5, 2012 from U.S. Appl. No. 12/753,664.
Co-pending U.S. Patent No. 8260489, issued Sep. 4, 2012.
Co-pending U.S. Publication No. 2010-0256891, filed Apr. 2, 2010.
Co-pending U.S. Publication No. 2010-0257477, filed Apr. 2, 2010.

* cited by examiner

Traffic Collision Report 500

| TRAFFIC COLLISION REPORT FORM ||||
|---|---|---|---|
| Date of Collision: March 16, 2009 | Time: 2:36pm | Road Conditions: Dry ||
| Street, City, ZIP Location: 263 Main St., Reno, NV 89502 ||||
| VEHICLE #1 || VEHICLE #2 ||
| License Plate #: D394763 || License Plate #: F598264 ||
| Year/Make/Model: 2005 Chevrolet Malibu || Year/Make/Model: 2004 Jeep Commanche ||
| Unit#: n/a || Unit#: n/a ||
| Owner Name/Phone: John Doe, 775-836-4872 || Owner Name/Phone: Mary Jones, 775-276-9403 ||
| Passenger Name/Phone: none || Passenger Name/Phone: Joe Smith 775-387-4987 ||
| DRIVER'S INFORMATION || DRIVER'S INFORMATION ||
| Name: John Doe || Name: Mary Jones ||
| Phone: 775-836-4872 || Phone: 775-276-9403 ||
| Driver's License # Nv274968375 || Driver's License # NV406928590 ||
| License State: NV || License State: NV ||
| INSURANCE COMPANY INFORMATION || INSURANCE COMPANY INFORMATION ||
| Insured Name: John Doe || Insured Name: Mary Jones ||
| Relationship to Driver: Self || Relationship to Driver: Self ||
| Insurance Company: ABC Insurance Co. || Insurance Company: XYZ Insurance Co. ||
| Policy #: ABC18472649 || Policy #: XYZ30596827 ||
| Agent/Agency Name: Robert Brown Insurance Agency || Agent/Agency Name: John White Insurance Agency ||
| POLICE INFORMATION ||||
| Responding Dept: Reno, NV || Police Report#: 847364 ||
| Officer's Name: William Friendly || Badge#: 39858 ||
| SAFETY DETAILS ||||

| | Yes | No | | Yes | No | | Yes | No |
|---|---|---|---|---|---|---|---|---|
| Stop Sign? | | x | Intersection? | | x | Driveable? | | x |
| Traffic Light? | | x | Backing? | | x | Animal (e.g., deer) | | x |
| Seat belts Used? | x | | Driveway? | | x | | | |
| Air Bags Deployed? | | x | Sideswipe? | x | | | | |

DIAGRAM OF COLLISION ( Geo-location data: N39°32.55811, W119°48.75720)

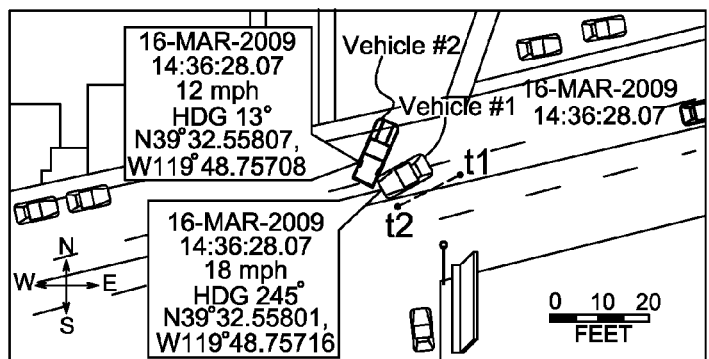

Description of Accident:
- Westbound vehicle #1 collides with eastbound vehicle #2 when eastbound vehicle #2 attempts to make left turn across westbound lane.
- Damage to front right of westbound vehicle #1.
- Damage to rear right of eastbound vehicle #2.

Event Specific Image 226

FIG. 5

METHODS, APPARATUS, AND SYSTEMS FOR ACQUIRING AND ANALYZING VEHICLE DATA AND GENERATING AN ELECTRONIC REPRESENTATION OF VEHICLE OPERATIONS

CROSS-REFERENCES TO RELATED APPLICATIONS

This application claims the benefit, under 35 U.S.C. §120, as a continuation (CON) of U.S. Non-provisional application Ser. No. 12/753,699, filed Apr. 2, 2010, entitled "Methods, Apparatus, and Systems for Acquiring and Analyzing Vehicle Data and Generating an Electronic Representation of Vehicle Operations."

Application Ser. No. 12/753,699 claims a priority benefit, under 35 U.S.C. §119(e), to U.S. provisional patent application Ser. No. 61/166,385, entitled "Geo-Referenced Electronic Drawing Application for Documenting and Reporting Events," filed on Apr. 3, 2009, and U.S. provisional patent application Ser. No. 61/166,392, entitled "Data Acquisition System for and Method of Analyzing Vehicle Data for Generating an Electronic Representation of Vehicle Operations," filed on Apr. 3, 2009.

Each the above-identified applications is incorporated herein by reference.

BACKGROUND

In any business setting, incidents that are not part of the standard business practice may take place and cause interruption to the business operation. Such incidents can potentially reduce the quality of the services or products of the business, and sometimes may impose civil or even criminal liabilities on the business. For any given business, the particular types of incidents that are disruptive may depend on the nature of the business. For example, with respect to companies that manage large fleets of vehicles, such as in any field service applications, vehicle accidents can be very disruptive to the business operations.

Systems and processes have been implemented for reporting and managing vehicle accidents. For example, upon arrival at the scene of a vehicle accident, a police officer or other investigator usually fills out a paper accident report explaining in detail the accident scene. As part of this report, the police officer or other investigator may attempt to draw a sketch of the accident scene on a diagram of the road, which is to be submitted with the paper accident report. However, a drawback of these paper-based reports, which may be handwritten and may include hand sketches, is that the content thereof may be inconsistent, sloppy, illegible, inaccurate, and/or incomplete. As a result, vehicle accidents may be poorly documented.

Further, the detailed information relating to, for example, a vehicle accident is typically acquired by interrogating the drivers involved, collecting eyewitness testimony, by visual observation of the accident scene, and the like. Consequently, the information may be prone to inaccuracy and contradictions. Additionally, interpretations of this information may be very subjective and inconsistent from one police officer or other investigator to another. Therefore, a need exists for improved ways of collecting, compiling, and interpreting information with respect to, for example, reporting vehicle accidents.

Computer-based information systems are becoming cheaper, more rugged, and increasingly networked. As a result, technological advances are changing the way that information is collected, analyzed, and managed. For example, certain processes and certain types of equipment and instrumentation are becoming more automatic in nature, especially with regard to the capture and manipulation of data and the conversion of data into useful information. In one example, vehicle control systems (or vehicle information systems) are becoming increasingly technologically sophisticated. Generally, vehicle control systems may be any systems and/or subsystems that are installed in a vehicle or otherwise associated with the vehicle. Vehicle control systems may include, for example, brake systems, engine systems, electrical systems, steering and suspension systems, emission systems, transmission systems, sensor systems, informational systems and the like. Vehicle control systems may provide detailed information of vehicle operations in electronic form.

SUMMARY

Applicants have recognized and appreciated that a drawback of current systems and processes for reporting and managing vehicle accidents is that they do not take advantage of vehicle control systems that may provide information of actual vehicle operations. Instead, these systems and processes for reporting and managing vehicle accidents are reliant on subjective information that is acquired and processed manually. Therefore, a need exists for ways of collecting and utilizing electronic vehicle information that reflects actual events with respect to vehicle operations, which may have particular usefulness in systems and processes for reporting and managing vehicle accidents.

In view of the foregoing, various embodiments of the present invention are directed to methods, apparatus and systems for documenting events via geo-referenced electronic drawings. With respect to vehicle accidents, in exemplary embodiments, one or more drawings may be provided that are referenced to a geographic location and/or that in some way indicate (to scale) the actual environment in which incidents have occurred. In various aspects, drawings may be provided to scale, include accurate directional and positional information, and/or include representations of various environmental landmarks (e.g., trees, buildings, poles, fire hydrants, barriers, any structures, etc) Examples of reports that may include one or more geo-referenced electronic drawings according to various inventive embodiments disclosed herein include, but are not limited to, vehicle accident reports.

In sum, one embodiment described herein is directed to an apparatus for documenting an incident involving a first vehicle at an incident site. The apparatus comprises: a communication interface; a memory to store processor-executable instructions; and a processing unit coupled to the communication interface, the display device, the user input device, and the memory, wherein upon execution of the processor-executable instructions by the processing unit. The processing unit: controls the communication interface to electronically receive source data representing at least one input image of a geographic area including the incident area; acquires, from a vehicle control system associated with the first vehicle, vehicle-based information relating to the first vehicle at a time during or proximate the incident; renders, based at least in part on the vehicle-based information, a marked-up image including a first representation of at least a portion of the incident overlaid on the at least one input image; and further controls the communication interface and/or the memory to electronically transmit and/or electronically store information relating to the marked-up digital image so as to document the incident with respect to the geographic area.

Another embodiment is directed to a method for documenting an incident involving a first vehicle at an incident site. The method comprises: A) electronically receiving source data representing at least one input image of a geographic area including the incident site; B) electronically receiving, from a vehicle control system associated with the first vehicle, vehicle-based information relating to the first vehicle at a time during or proximate the incident; C) based at least in part on the vehicle-based information received in B), digitally representing, on the at least one input image, a first representation of at least a portion of the incident to thereby generate a marked-up digital image including the first representation; and D) electronically transmitting and/or electronically storing information relating to the marked-up digital image so as to document the incident with respect to the geographic area.

A further embodiment is directed to at least one computer-readable medium encoded with instructions that, when executed by at least one processing unit, perform a method for documenting an incident involving a first vehicle at an incident site. The method comprises: A) electronically receiving source data representing at least one input image of a geographic area including the incident site; B) electronically receiving, from a vehicle control system associated with the first vehicle, vehicle-based information relating to the first vehicle at a time during or proximate the incident; C) based at least in part on the vehicle-based information received in B), digitally representing, on the at least one input image, a first representation of at least a portion of the incident to thereby generate a marked-up digital image including the first representation; and D) electronically transmitting and/or electronically storing information relating to the marked-up digital image so as to document the incident with respect to the geographic area.

The following U.S. published applications are hereby incorporated herein by reference:

U.S. publication no. 2008-0228294-A1, published Sep. 18, 2008, filed Mar. 13, 2007, and entitled "Marking System and Method With Location and/or Time Tracking;"

U.S. publication no. 2008-0245299-A1, published Oct. 9, 2008, filed Apr. 4, 2007, and entitled "Marking System and Method;"

U.S. publication no. 2009-0013928-A1, published Jan. 15, 2009, filed Sep. 24, 2008, and entitled "Marking System and Method;"

U.S. publication no. 2009-0202101-A1, published Aug. 13, 2009, filed Feb. 12, 2008, and entitled "Electronic Manifest of Underground Facility Locate Marks;"

U.S. publication no. 2009-0202110-A1, published Aug. 13, 2009, filed Sep. 11, 2008, and entitled "Electronic Manifest of Underground Facility Locate Marks;"

U.S. publication no. 2009-0201311-A1, published Aug. 13, 2009, filed Jan. 30, 2009, and entitled "Electronic Manifest of Underground Facility Locate Marks;"

U.S. publication no. 2009-0202111-A1, published Aug. 13, 2009, filed Jan. 30, 2009, and entitled "Electronic Manifest of Underground Facility Locate Marks;"

U.S. publication no. 2009-0204625-A1, published Aug. 13, 2009, filed Feb. 5, 2009, and entitled "Electronic Manifest of Underground Facility Locate Operation;"

U.S. publication no. 2009-0204466-A1, published Aug. 13, 2009, filed Sep. 4, 2008, and entitled "Ticket Approval System For and Method of Performing Quality Control In Field Service Applications;"

U.S. publication no. 2009-0207019-A1, published Aug. 20, 2009, filed Apr. 30, 2009, and entitled "Ticket Approval System For and Method of Performing Quality Control In Field Service Applications;"

U.S. publication no. 2009-0210284-A1, published Aug. 20, 2009, filed Apr. 30, 2009, and entitled "Ticket Approval System For and Method of Performing Quality Control In Field Service Applications;"

U.S. publication no. 2009-0210297-A1, published Aug. 20, 2009, filed Apr. 30, 2009, and entitled "Ticket Approval System For and Method of Performing Quality Control In Field Service Applications;"

U.S. publication no. 2009-0210298-A1, published Aug. 20, 2009, filed Apr. 30, 2009, and entitled "Ticket Approval System For and Method of Performing Quality Control In Field Service Applications;"

U.S. publication no. 2009-0210285-A1, published Aug. 20, 2009, filed Apr. 30, 2009, and entitled "Ticket Approval System For and Method of Performing Quality Control In Field Service Applications;"

U.S. publication no. 2009-0204238-A1, published Aug. 13, 2009, filed Feb. 2, 2009, and entitled "Electronically Controlled Marking Apparatus and Methods;"

U.S. publication no. 2009-0208642-A1, published Aug. 20, 2009, filed Feb. 2, 2009, and entitled "Marking Apparatus and Methods For Creating an Electronic Record of Marking Operations;"

U.S. publication no. 2009-0210098-A1, published Aug. 20, 2009, filed Feb. 2, 2009, and entitled "Marking Apparatus and Methods For Creating an Electronic Record of Marking Apparatus Operations;"

U.S. publication no. 2009-0201178-A1, published Aug. 13, 2009, filed Feb. 2, 2009, and entitled "Methods For Evaluating Operation of Marking Apparatus;"

U.S. publication no. 2009-0202112-A1, published Aug. 13, 2009, filed Feb. 11, 2009, and entitled "Searchable Electronic Records of Underground Facility Locate Marking Operations;"

U.S. publication no. 2009-0204614-A1, published Aug. 13, 2009, filed Feb. 11, 2009, and entitled "Searchable Electronic Records of Underground Facility Locate Marking Operations;"

U.S. publication no. 2009-0238414-A1, published Sep. 24, 2009, filed Mar. 18, 2008, and entitled "Virtual White Lines for Delimiting Planned Excavation Sites;"

U.S. publication no. 2009-0241045-A1, published Sep. 24, 2009, filed Sep. 26, 2008, and entitled "Virtual White Lines for Delimiting Planned Excavation Sites;"

U.S. publication no. 2009-0238415-A1, published Sep. 24, 2009, filed Sep. 26, 2008, and entitled "Virtual White Lines for Delimiting Planned Excavation Sites;"

U.S. publication no. 2009-0241046-A1, published Sep. 24, 2009, filed Jan. 16, 2009, and entitled "Virtual White Lines for Delimiting Planned Excavation Sites;"

U.S. publication no. 2009-0238416-A1, published Sep. 24, 2009, filed Jan. 16, 2009, and entitled "Virtual White Lines for Delimiting Planned Excavation Sites;"

U.S. publication no. 2009-0237408-A1, published Sep. 24, 2009, filed Jan. 16, 2009, and entitled "Virtual White Lines for Delimiting Planned Excavation Sites;"

U.S. publication no. 2009-0238417-A1, published Sep. 24, 2009, filed Feb. 6, 2009, and entitled "Virtual White Lines for Indicating Planned Excavation Sites on Electronic Images;"

U.S. publication no. 2009-0327024-A1, published Dec. 31, 2009, filed Jun. 26, 2009, and entitled "Methods and Apparatus for Quality Assessment of a Field Service Operation;"

U.S. publication no. 2010-0010862-A1, published Jan. 14, 2010, filed Aug. 7, 2009, and entitled "Methods and Apparatus for Quality Assessment of a Field Service Operation Based on Geographic Location;"

U.S. publication no. 2010-0010863-A1, published Jan. 14, 2010, filed Aug. 7, 2009, and entitled "Methods and Apparatus for Quality Assessment of a Field Service Operation Based on Multiple Scoring Categories;"

U.S. publication no. 2010-0010882-A1, published Jan. 14, 2010, filed Aug. 7, 2009, and entitled "Methods and Apparatus for Quality Assessment of a Field Service Operation Based on Dynamic Assessment Parameters;" and U.S. publication no. 2010-0010883-A1, published Jan. 14, 2010, filed Aug. 7, 2009, and entitled "Methods and Apparatus for Facilitating a Quality Assessment of a Field Service Operation Based on Multiple Quality Assessment Criteria."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The drawings are not necessarily to scale, emphasis instead generally being placed upon illustrating the principles of the invention.

FIG. 5 illustrates an example of a report that is generated using the geo-referenced and/or time-referenced electronic drawing application and that includes an electronic representation of vehicle operations, according to the present disclosure;

DETAILED DESCRIPTION

Figure 1:
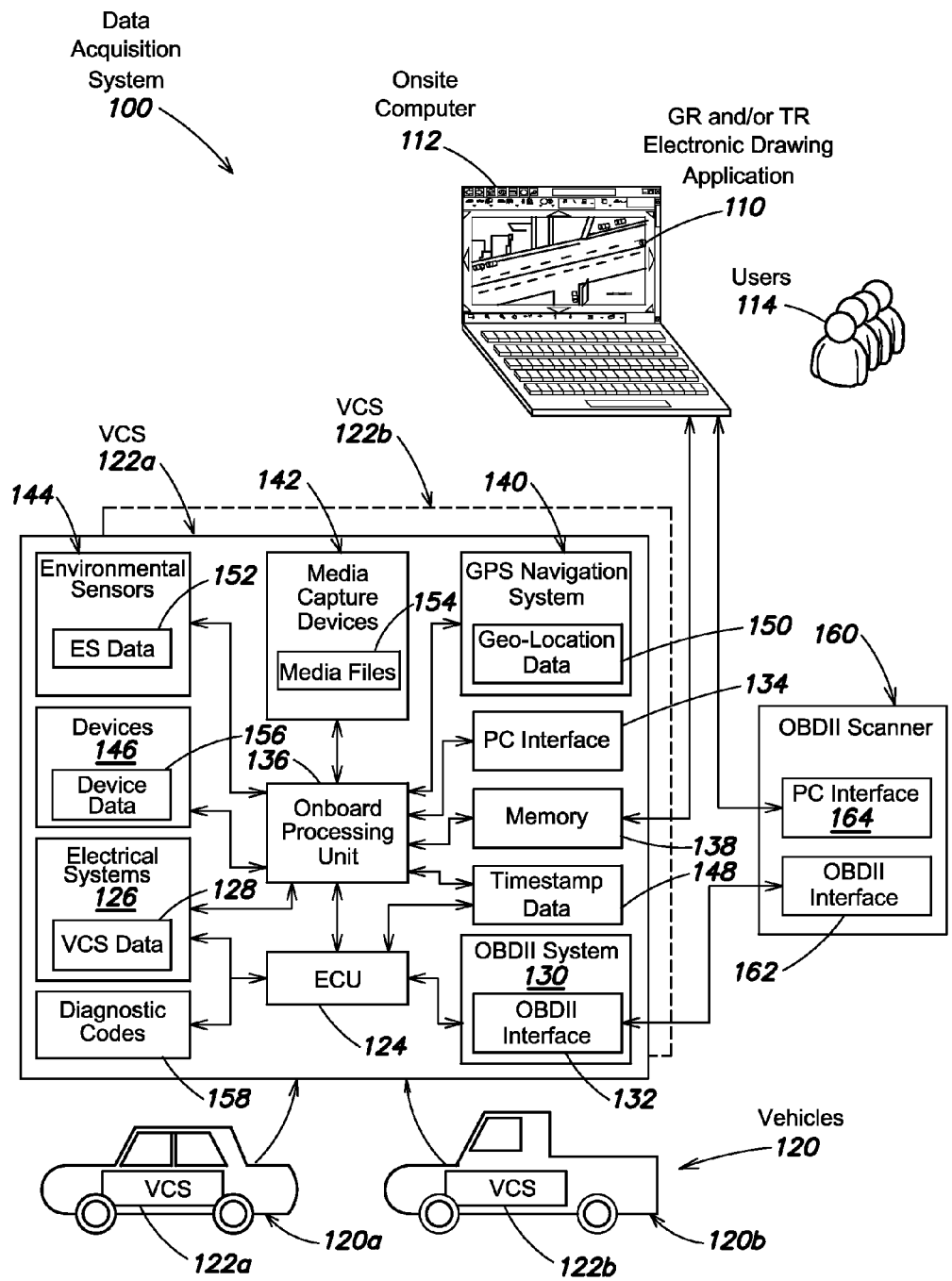
FIG. 1 illustrates a functional block diagram of a data acquisition system that includes the geo-referenced and/or time-referenced electronic drawing application for generating an electronic representation of vehicle operations, according to the present disclosure.

Following below are more detailed descriptions of various concepts related to, and embodiments of, inventive methods, apparatus and systems according to the present disclosure for acquiring and analyzing vehicle data and generating an electronic representation of vehicle operations. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

A data acquisition system for and method of analyzing vehicle data for generating an electronic representation of vehicle operations is described herein. Certain embodiments describe a mechanism for generating an electronic representation of vehicle operations includes an automated geo-referenced and/or time-referenced electronic drawing application.

The geo-referenced and/or time-referenced electronic drawing application may provide a mechanism for importing a geo-referenced image upon which may be rendered the electronic representation of vehicle operations. The electronic representation of vehicle operations may be rendered automatically and/or manually. The electronic representation of vehicle operations may be rendered on the geo-referenced image by analyzing vehicle information that is captured electronically from one or more vehicles, automatically selecting symbols that correspond to the one or more vehicles from a symbols library, and automatically mapping the relative and actual positions of the one or more vehicles on the geo-referenced image. The rendering of the electronic representation of vehicle operations may occur at one or more instances in time in order to indicate a sequence of events.

It should be appreciated that while the imported or otherwise acquired image is described herein as "geo-referenced," and the drawing application is likewise described as geo-referenced, the image need not be geo-referenced unless required for a particular implementation and the drawing application may be used for non geo-referenced images. In many instances, an image that is not geo-referenced may be suitably used. Examples of non geo-referenced images that may be suitable in various scenarios are: a stock or generic image of an intersection, a stock or generic image of an room, a stock or generic image of a street, and a photograph taken during investigation of an incident or generation of a report on the incident. Of course, these are merely exemplary, as many other types of non geo-referenced images are possible. Further, may be appreciated the image need not be time-referenced unless required for a particular implementation and that the drawing application may be used for non time-referenced images.

Further, the automated geo-referenced and/or time-referenced electronic drawing application may provide a mechanism for generating a report, such as a vehicle accident report, that includes the electronic representation of vehicle operations that is based on actual vehicle data. Additionally, a networked system is described that includes the automated geo-referenced and/or time-referenced electronic drawing application of the present disclosure for generating an electronic representation of vehicle operations.

The data acquisition system may provide an automated way to generate an electronic representation of vehicle operations that is rendered in a time-referenced manner on real world geo-referenced images with symbols, shapes, and/or lines in order to provide improved and consistent accuracy with respect to drawings that support, for example, vehicle incident reports.

The automated geo-referenced and/or time-referenced electronic drawing application may provide the ability to electronically mark up real world geo-referenced images with symbols, shapes, and/or lines to scale, again providing improved and consistent accuracy with respect to drawings that support vehicle accident reports.

The automated geo-referenced and/or time-referenced electronic drawing application may also provides a standard symbols library, thereby providing standardization with respect to drawings that support, for example, vehicle accident reports.

Further, the automated geo-referenced and/or time-referenced electronic drawing application may provide an electronic representation of vehicle operations that is based on actual vehicle data in a slideshow and/or a 2-dimensional and/or 3-dimensional movie style of presentation, which may depict in time-lapsed fashion, for example, the actual events leading up to a vehicle collision, the actual events at the moment of the collision, and the actual events just after the collision.

A networked system that includes the automated geo-referenced and/or time-referenced electronic drawing application may provide improved distribution and tracking of vehicle accident reports among entities and may provide improved control over access to reports.

Referring to FIG. 1, a functional block diagram of a data acquisition system 100 that includes a geo-referenced (GR) and/or time-referenced (TR) electronic drawing application 110 for generating an electronic representation of vehicle operations is presented.

GR and/or TR electronic drawing application 110 may be executing on any suitable computing device. In one example, GR and/or TR electronic drawing application 110 may be installed and executing on an onsite computer 112. Onsite computer 112 may be, for example, a portable computer, a personal computer, a tablet device, a PDA, a cellular radiotelephone, a mobile computing device, a touch-screen device, a touchpad device, or generally any device including, or connected to, a processor and a user interface. In one example, the onsite computer 112 may be any on-site computer or mobile computer, such as, but not limited to, a computer that is present in the vehicle that is being used by users 114 in the field. Users 114 may be, for example, personnel of accident investigation companies, law enforcement agencies, and/or insurance companies.

Data acquisition system 100 further includes one or more vehicles 120. Vehicles 120 may be, for example, any one or more vehicles that are involved in a vehicle accident. By way of example, data acquisition system 100 may include a vehicle 120a and 120b, which hereafter may represent two vehicles that are involved in a vehicle collision, the details of which are to be indicated using GR and/or TR electronic drawing application 110. Further, each vehicle 120 includes a vehicle control system (VCS) 122. For example, vehicle 120a includes a VCS 122a and vehicle 120b includes a VCS 122b.

Generally, vehicle control systems may be any systems and/or subsystems that are installed in a vehicle. Vehicle control systems may include, for example, brake systems, engine systems (e.g., fuel injection systems, ignition systems, cooling systems, etc), electrical systems, steering and suspension systems, emission systems, transmission systems, sensor systems, any combinations of components and/or devices that are useful in a vehicle, and the like.

In one example and referring to FIG. 1, each VCS 122 may include, for example, an engine control unit or electronic control unit (ECU) 124, which may be an embedded microprocessor that controls one or more of the electrical systems 126 or subsystems in a vehicle. Any information related to, for example, electrical systems 126 and/or ECU 124 is hereafter referred to as VCS data 128. VCS data 128 may include, for example, any information of the brake systems, engine systems, electrical systems, steering and suspension systems, emission systems, transmission systems, sensor systems, and the like.

Each VCS 122 may further include an onboard diagnostics (OBD) system, such as an OBD-2 (OBDII) system 130. An OBD system, such as OBDII system 130, provides vehicle self-diagnostic and reporting capability. OBDII system 130 provides access to state of health information for various vehicle systems and subsystems. In particular, OBDII system 130 may provide access to ECU 124, which may be a source of information about the systems and subsystems in a vehicle. OBDII system 130 may include an OBDII interface 132 by which external devices may access OBDII system 130. OBDII interface 132 utilizes standard connectors and communication protocols.

Further, access to each VCS 122 may be achieved via a personal computer (PC) interface 134, such as any wired and/or wireless communication interface. In one example, VCS 122 may be connected to onsite computer 112 via PC interface 134. Example wired communication interfaces may include, but are not limited to, universal serial bus (USB) ports, RS232 connectors, RJ45 connectors, Ethernet, and any combinations thereof. Example wireless communication interfaces may include, but are not limited to, Bluetooth® technology, Wi-Fi, Wi-Max, IEEE 802.11 technology, radio frequency (RF), local (LAN) and wide (WAN) area networks, Internet, shared wireless access protocol (SWAP), Infrared Data Association (IrDA) compatible protocols and other types of wireless networking protocols, and any combinations thereof.

Each VCS 122 may further include other systems and devices that may be provided as standard equipment of a vehicle and/or as custom installed equipment. For example, each VCS 122 may include an onboard processing unit 136 and associated memory 138, a global positioning system (GPS) navigation system 140, one or more media capture devices 142, one or more environmental sensors 144, and one or more other devices 146.

Onboard processing unit 136 may be provided in combination with or in place of ECU 124. In one example, onboard processing unit 136 may be a custom installed processing unit that may be operating in combination with each VCS 122. Memory 138 that may be associated with onboard processing unit 136 may be any standard data storage medium. Additionally, an internal timing system (not shown) of onboard processing unit 136 and/or ECU 124 may provide date and time information, which is hereafter referred to as timestamp data 148. In order to indicate a sequence of events, the rendering of the electronic representation of vehicle operations by GR and/or TR electronic drawing application 110 may be based on information at one or more instances in time as indicated in timestamp data 148.

In one example, GPS navigation system 140 is standard equipment in a certain vehicle 120. GPS navigation system 140 may be any location tracking system that can determine its geographical location to a certain degree of accuracy. For example, GPS navigation system 140 may include a GPS receiver or a global navigation satellite system (GNSS) receiver. A GPS receiver may provide, for example, any standard format data stream, such as a National Marine Electronics Association (NMEA) data stream. The data of GPS navigation system 140 is hereafter referred to as geo-location data 150.

In one example, media capture devices 142 are custom installed equipment in a certain vehicle 120. Media capture devices 142 may be used for capturing media files 154. Media capture devices 142 may be any media capture devices, such as digital cameras, wide angle digital cameras, 360 degree digital cameras, infrared (IR) cameras, digital audio recorders, digital video recorders, and the like. Therefore, the associated media files 154 may be, for example, digital image files, digital audio files, digital video files, and the like. Media capture devices 142 may be useful for capturing images and/or audio in the environment in which the vehicle is operated and, in particular, may be useful for capturing images and/or audio at the scene of an accident.

In one example, environmental sensors 144 are custom installed equipment in a certain vehicle 120. Environmental sensors 144 may include, for example, a temperature sensor, a humidity sensor, and a light sensor. In one example, the temperature sensor may operate from about −40 C to about +125 C and the humidity sensor may provide the relative humidity measurement (e.g., 0% to 100% humidity). In one example, the light sensor may be a cadmium sulfide (CdS) photocell. In a vehicle application, the ambient temperature, humidity, and light intensity in the environment in which the vehicle is operated may be captured via the temperature sensor, the humidity sensor, and the light sensor, respectively. The ability to capture the environment conditions at, for example, the scene of a vehicle accident may be useful information to include in vehicle accident reports and, in particular, for determining contributing factors with respect to the possible causes of the accident. The data of environmental sensors 144 is hereafter referred to as environmental sensor (ES) data 152.

In one example, the other devices 146 are custom installed equipment in a certain vehicle 120. Examples of devices 146 that may be useful in each VCS 122 may include, but are not limited to, a compass, an inclinometer, and an accelerometer. The compass of devices 146 may be any commercially available electronic and/or mechanical compass for providing the directional heading of the vehicle in which it is installed. The heading means the direction toward which the compass that is installed in the vehicle is moving, such as north, south, east, west, and any intermediate directions. The heading of the vehicle may be useful information to GR and/or TR electronic drawing application 110 when generating an electronic representation of vehicle operations.

An inclinometer is an instrument for measuring angles of slope (or tilt) or inclination of an object with respect to gravity. The inclinometer of devices 146 may be any commercially available inclinometer device. In one example, the inclinometer may be a multi-axis digital device for sensing the inclination of the vehicle in which it is installed. In particular, the inclinometer may be used to detect the current angle of the vehicle in relation to both the horizontal and vertical planes. The angle of the vehicle may be useful information to GR and/or TR electronic drawing application 110 when generating an electronic representation of vehicle operations.

An accelerometer is a device for measuring acceleration and gravity-induced reaction forces. A multi-axis accelerometer is able to detect magnitude and direction of the acceleration as a vector quantity. The acceleration may be expressed in terms of g-force, which is a measurement of an object's acceleration. The accelerometer of devices 146 may be any commercially available accelerometer device, such as a 3-axis accelerometer. In one example, the accelerometer may be utilized to determine the motion (e.g., rate of movement) of the vehicle as it is utilized. Where the inclinometer may detect the degree of inclination across the horizontal and vertical axes, the accelerometer may detect movement across a third axis (depth). The acceleration and other gravity-induced reaction forces of the vehicle may be useful information to GR and/or TR electronic drawing application 110 when generating an electronic representation of vehicle operations. The data of devices 146 is hereafter referred to as device data 156.

Each VCS 122 is not limited to one instance only of the above-mentioned types of media capture devices 142, environmental sensors 144, and any other devices 146. Any number of any types of devices that may be useful in data acquisition system 100 may be included in each VCS 122.

Table 1 shows an example of a sample of information that may be captured by each VCS 122 of data acquisition system 100 of the present disclosure.

TABLE 1

Example data that may be captured within data acquisition system 100

| | |
|---|---|
| VIN (17 characters) | Year/make/model |
| Timestamp data | 16-MAR-2009 14:36:27.52 |
| Speed | 41 mph |
| Throttle position | 31% |
| Break position | 0% |
| Gear | 4 |
| Driver airbag status | Not deployed |
| Passenger airbag status | Not deployed |
| Geo-location data | N39° 32.55808, W119° 48.75673 (deg. and dec. min.) |
| Temperature data | 73 degrees F. |
| Humidity data | 30% |
| Light data | 30 |
| Compass data | 248 degrees |
| Inclinometer data | −0.23 |
| Accelerometer data | +0.036, −0.012, +0.025 (x, y, z) |

Referring to Table 1, the timestamp data is an example of information in timestamp data 148; the speed, throttle position, break position, gear, driver airbag status, and passenger airbag status are examples of information in VCS data 128; the geo-location data is an example of information in geo-location data 150; the temperature data, humidity data, and light data are examples of information in ES data 152; and the compass data, inclinometer data, and accelerometer data are examples of information in device data 156.

Data acquisition system 100 further includes commercially available OBDII diagnostic tools. In one example, data acquisition system 100 includes an OBDII scanner 160. OBDII scanner 160 may include an OBDII interface 162, which may be a counterpart to OBDII interface 132 of OBDII system 130 of each VCS 122. OBDII scanner 160 may include a PC interface 164. In one example, OBDII scanner 160 may be connected to onsite computer 112 via PC interface 164. PC interface 164 may be any wired and/or wireless communications interface, such as described with reference to PC interface 134 of each VCS 122. OBDII scanner 160 and/or onsite computer 112 may be used, for example, for reading diagnostic codes 158 that are generated by ECU 124.

In certain embodiments, certain systems and/or devices within each VCS 122 may be standalone devices that have the ability to record and store their own data, which may be accessed independent of ECU 124 and/or onboard processing unit 136. For example, electrical systems 126 may generate and store locally the VCS data 128, GPS navigation system 140 may generate and store locally the geo-location data 150, media capture devices 142 may generate and store locally the media files 154, environmental sensors 144 may generate and store locally the ES data 152, devices 146 may generate and store locally the device data 156, ECU 124 may generate and store locally the diagnostic codes 158, and so on.

In other embodiments, certain systems and/or devices within each VCS 122 are not standalone devices and, thus, store data in memory 138, which may be accessed via ECU 124 and/or onboard processing unit 136. For example, VCS data 128 of electrical systems 126, geo-location data 150 of GPS navigation system 140, media files 154 of media capture devices 142, ES data 152 of environmental sensors 144, device data 156 of devices 146, and diagnostic codes 158 of ECU 124 may be stored in memory 138.

In the case of any standalone device, in the event of a power failure due to, for example, damage to the vehicle battery in an accident, certain standalone devices may be self-powered and, thus, may be interrogated. Alternatively, any devices may be removed from the vehicle and interrogated external to the vehicle.

In either case, a cache of information is available within each VCS 122. Further, each record of data or other information in, for example, VCS data 128, geo-location data 150, media files 154, ES data 152, device data 156 of devices 146, and diagnostic codes 158 is timestamped. As a result, GR and/or TR electronic drawing application 110 may utilize this information for recreating the operations of a certain vehicle 120 and generating an electronic representation of its operation for any moments in times.

With respect to capturing VCS data 128 of electrical systems 126, geo-location data 150 of GPS navigation system 140, media files 154 of media capture devices 142, ES data 152 of environmental sensors 144, device data 156 of devices 146, and diagnostic codes 158 of ECU 124, information may be captured based on events that are detected in the vehicle, such as the deployment of an airbag and/or a certain g-force detected by the accelerometer. Additionally, information may be captured automatically at programmed periodic intervals, such as every 100 milliseconds, every 500 milliseconds, every 1 second, every 10 seconds, and the like. Further, a certain predefined quantity of VCS data 128, geo-location data 150, media files 154, ES data 152, device data 156, and diagnostic codes 158 may be cached in memory. For example, a rolling cache of, for example, 10 minutes worth of VCS data 128, geo-location data 150, media files 154, ES data 152, device data 156, and diagnostic codes 158 may be stored in memory. This cache of information may be locked in memory, for example, upon ECU 124 sensing the deployment of an airbag, indicating a possible vehicle collision. Additionally, the capacity of any memory of a certain VCS 122 may be suitably large to store, for example, a day's or week's worth of data that may be searched for any information of interest with respect to any moment in time, such as the information the corresponds to the time of a vehicle collision. Any information stored in a certain VCS 122 may be accessed, for example, by onsite computer 112 using PC interface 134.

Because vehicles 120 vary in make, model, and year, the capability of their respective vehicle control systems may vary. Therefore, the information available may be dependent on the capability of the vehicle control system of any vehicle of interest. In one example, a certain vehicle 120 may include all the capabilities of VCS 122 that is shown in FIG. 1. As a result, a full complement of data is available (e.g., VCS data 128, geo-location data 150, media files 154, ES data 152, device data 156, and diagnostic codes 158) is available for use by GR and/or TR electronic drawing application 110 when rendering the electronic representation of vehicle operations. In another example, a certain vehicle 120 may include limited capabilities only of VCS 122. For example, the VCS 122 may include ECU 124, electrical systems 126, OBDII system 130, and GPS navigation system 140 only. As a result, a limited amount of data only is available (e.g., VCS data 128, geo-location data 150, timestamp data 148, and diagnostic codes 158) is available for use by GR and/or TR electronic drawing application 110 when rendering the electronic representation of vehicle operations.

In operation, GR and/or TR electronic drawing application 110 provides a mechanism for importing a geo-referenced image (not shown) upon which may be rendered the electronic representation of vehicle operations, wherein the rendering may occur automatically and/or manually. The electronic representation of vehicle operations may be rendered on the geo-referenced image by reading and analyzing, for example, VCS data 128, geo-location data 150, media files 154, ES data 152, device data 156, and diagnostic codes 158 that are captured electronically from one or more vehicles 120, automatically selecting symbols that correspond to the one or more vehicles from a symbols library, and automatically mapping the relative and actual positions of the one or more vehicles 120 on the geo-referenced image. The rendering of the electronic representation of vehicle operations may occur at one or more instances in time in order to indicate a sequence of events. Further, GR and/or TR electronic drawing application 110 may include a mechanism for generating reports, such as vehicle accident reports. More details of GR and/or TR electronic drawing application 110 are described with reference to FIG. 2. Examples of electronic representations of vehicle operations that are rendered on geo-referenced images are shown with reference to FIGS. 3 and 4. An example of an accident report that may include an electronic representation of vehicle operations rendered on geo-referenced image is shown with reference to FIG. 5.

In certain embodiments, because vehicles 120 may be any year, make, and model of vehicle, certain vehicles 120 may have limited VCS capability and/or VCS accessibility. Further, certain vehicles 120 may not include certain or any electrical systems 126, GPS navigation system 140, media capture devices 142, environmental sensors 144, and devices 146. Therefore, GR and/or TR electronic drawing application 110 also provides the capability for a user 114 to manually create an electronic representation of vehicle operations rendered on a geo-referenced image. In one example, the electronic representation of the operations of both vehicle 120*a* and 120*b* is rendered automatically on the geo-referenced image. In another example, the electronic representation of the operations of vehicle 120*a* is rendered automatically on a geo-referenced image, while the electronic representation of the operations of vehicle 120*b* is created manually (in full or in part) by user 114 on the geo-referenced image. In yet another example, the electronic representation of the operations of both vehicle 120*a* and 120*b* is created manually (in full or in part) by user 114 on the same geo-referenced image. Any manual generation may be based on visual observations at the scene and/or descriptions provide by persons involved and/or other witnesses.

Figure 2:
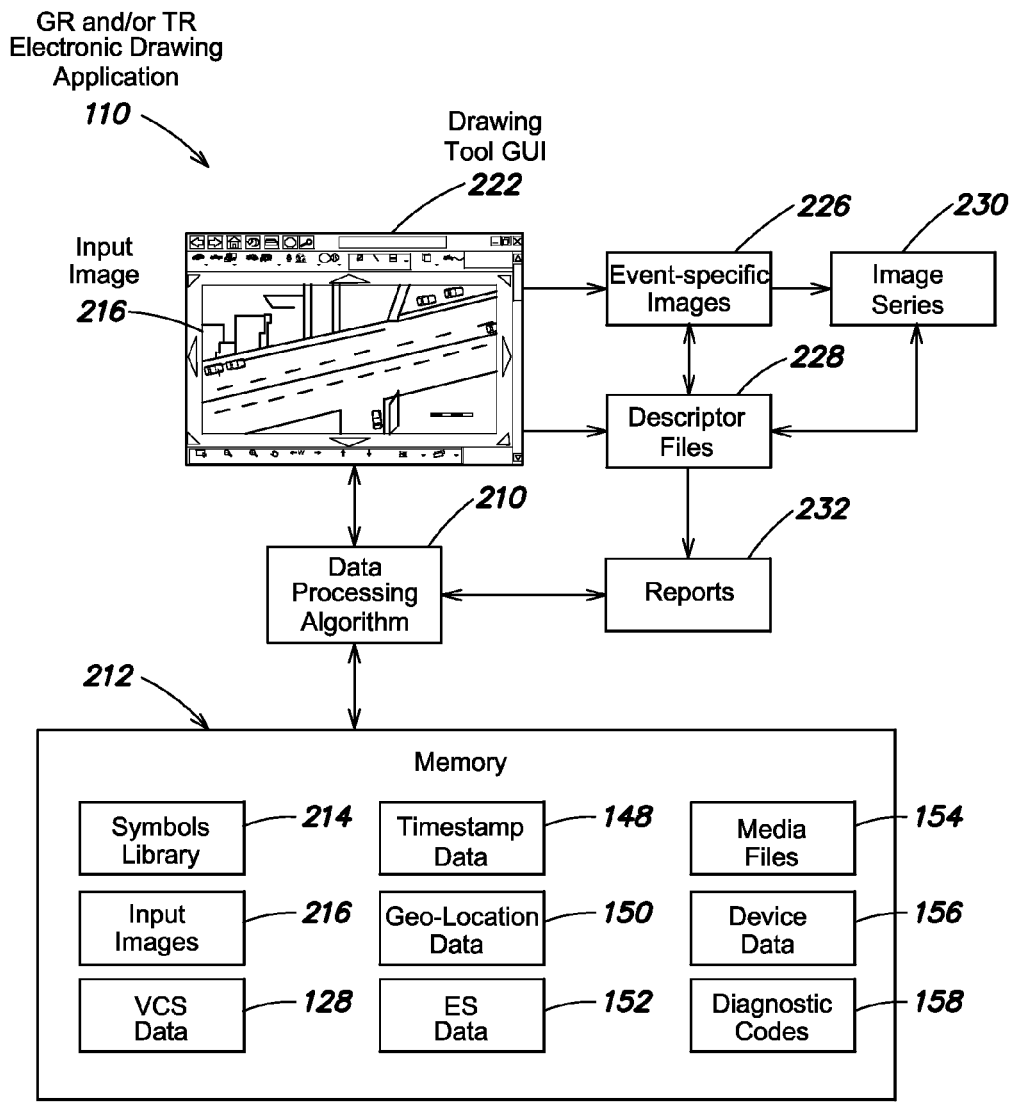
FIG. 2 illustrates a functional block diagram of the execution of a geo-referenced and/or time-referenced electronic drawing application for generating an electronic representation of vehicle operations, according to the present disclosure.

Referring to FIG. 2, a functional block diagram of GR and/or TR electronic drawing application 110 for generating an electronic representation of vehicle operations is presented. GR and/or TR electronic drawing application 110 may be a standalone and/or a network-based software application for importing a geo-referenced image for generating an electronic representation of vehicle operations thereon, thereby indicating the details of, for example, a vehicle accident.

GR and/or TR electronic drawing application 110 may include, for example, a data processing algorithm 210 and have access to memory 212. Data processing algorithm 210 may be stored on memory 212 or another memory and include program instructions executable on a processing unit. Memory 212 may be any standard data storage medium. In one example, a symbols library 214, a collection of input images 216, certain VCS data 128, certain geo-location data 150, certain media files 154, certain ES data 152, certain device data 156, and diagnostic codes 158 may be stored in memory 212.

Symbols library 214 and input images 216 may be used to support the drawing functions of GR and/or TR electronic drawing application 110. Certain VCS data 128, geo-location data 150, media files 154, ES data 152, device data 156, and diagnostic codes 158 may be analyzed by data processing algorithm 210 for automatically generating an event-specific electronic representation of vehicle operations. Additionally, GR and/or TR electronic drawing application 110 allows a user to import a geo-referenced image and manually mark up the image with symbols and/or any other markings for indicating the details of the vehicle accident.

A drawing tool graphical user interface (GUI) 222 is associated with GR and/or TR electronic drawing application 110 for viewing the electronic representation of vehicle operations that may be generated automatically and/or manually. Drawing tool GUI 222 is suitable for presenting on the display of any computing device, such as onsite computer 112. By reading geographic location information from geo-location data 150 and/or by processing geographic location information that may be manually entered, data processing algorithm 210 retrieves a certain input image 216 that corresponds to the geographic location information and displays the input image 216 in a window of drawing tool GUI 222. Geographic location information may be, for example, a physical address, latitude and longitude coordinates, and/or any GPS data.

For purposes of the present disclosure, an input image 216 is any image represented by source data that is electronically processed (e.g., the source data is in a computer-readable format) to display the image on a display device. An input image 216 may include any of a variety of paper/tangible image sources that are scanned (e.g., via an electronic scanner) or otherwise converted so as to create source data (e.g., in various formats such as XML, PDF, JPG, BMP, etc.) that can be processed to display the input image 216. An input image 216 also may include an image that originates as source data or an electronic file without necessarily having a corresponding paper/tangible copy of the image (e.g., an image of a "real-world" scene acquired by a digital still frame or video camera or other image acquisition device, in which the source data, at least in part, represents pixel information from the image acquisition device).

In some exemplary implementations, input images 216 according to the present disclosure may be created, provided, and/or processed by a geographic information system (GIS) that captures, stores, analyzes, manages and presents data referring to (or linked to) location, such that the source data representing the input image 216 includes pixel information from an image acquisition device (corresponding to an acquired "real world" scene or representation thereof), and/or spatial/geographic information ("geo-encoded information").

In some exemplary implementations, one or more input images 216 may be stored in local memory 212 of the onsite computer 112 and/or retrieved from an optional remote computer and then stored in local memory. Various information may be derived from the one or more input images for display (e.g., all or a portion of the input image, metadata associated with the input image, etc.).

Figure 8:
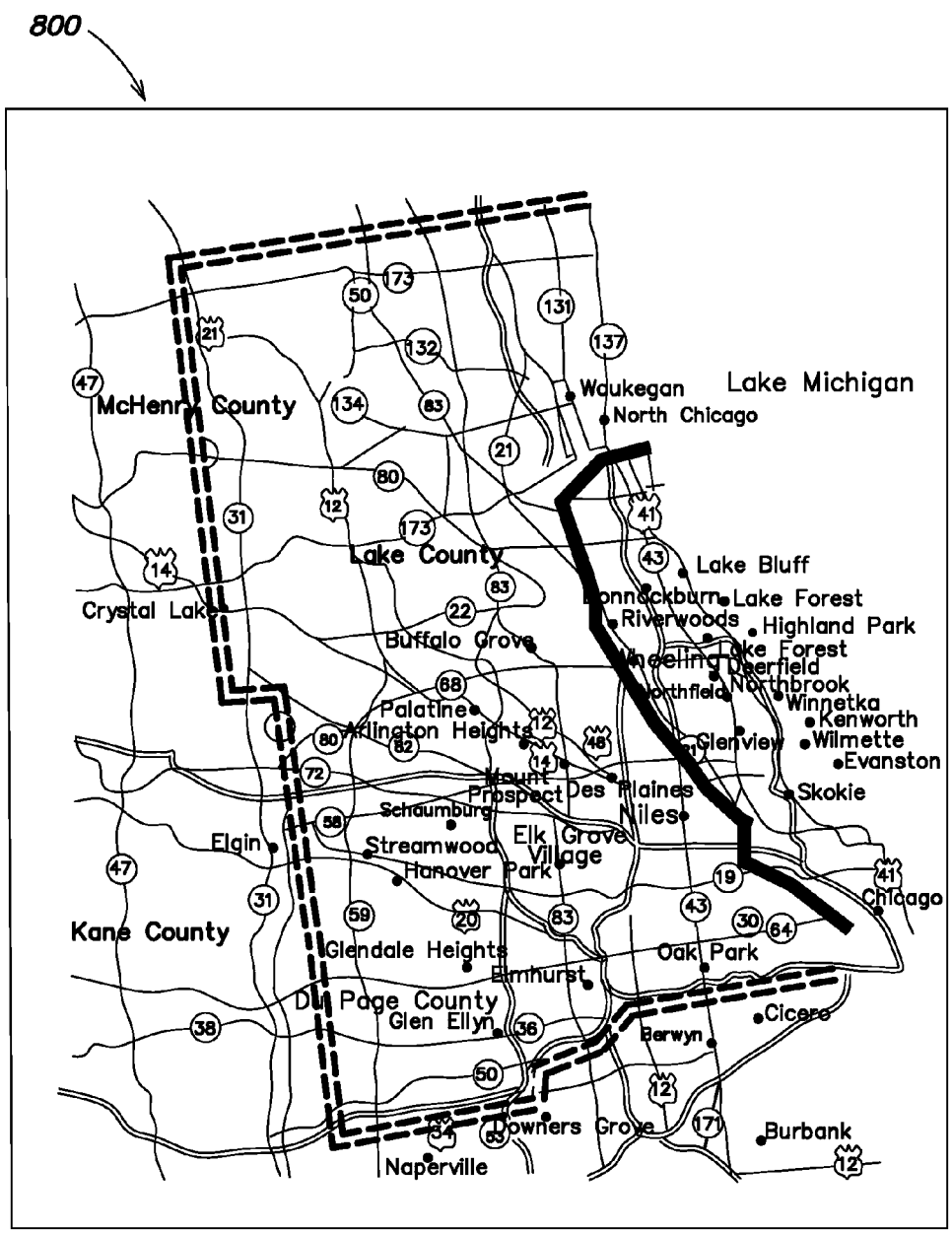
FIG. 8 shows a map, representing an exemplary input image.
Figure 9:
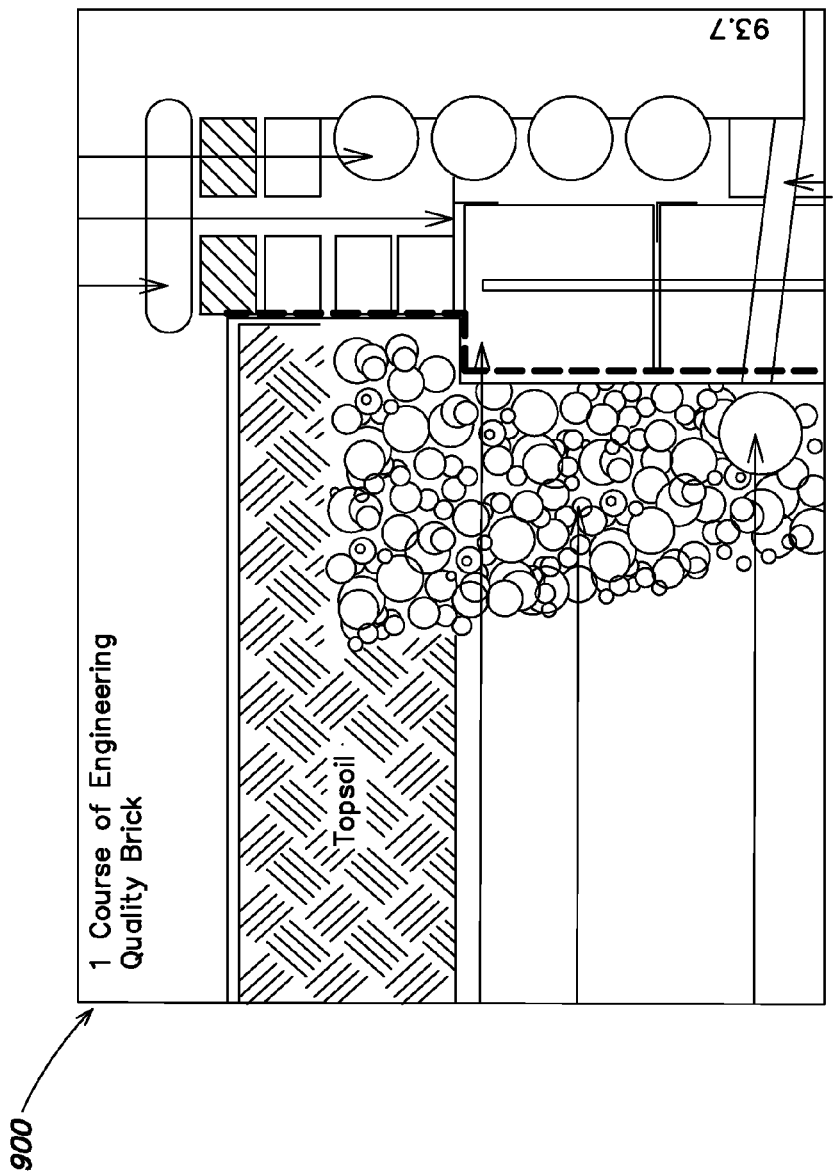
FIG. 9 shows a construction/engineering drawing, representing an exemplary input image.
Figure 10:
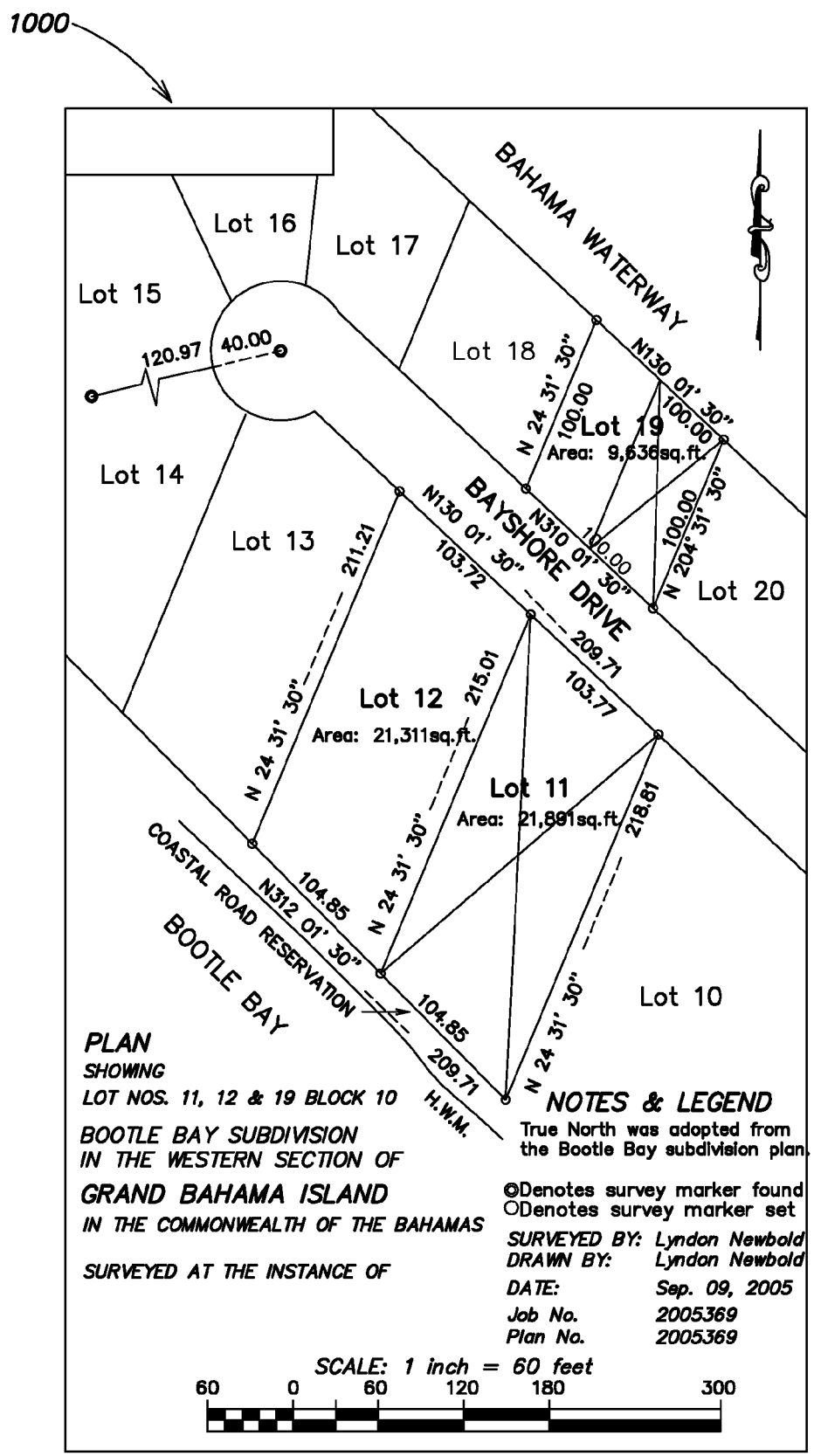
FIG. 10 shows a land survey map, representing an exemplary input image.
Figure 11:
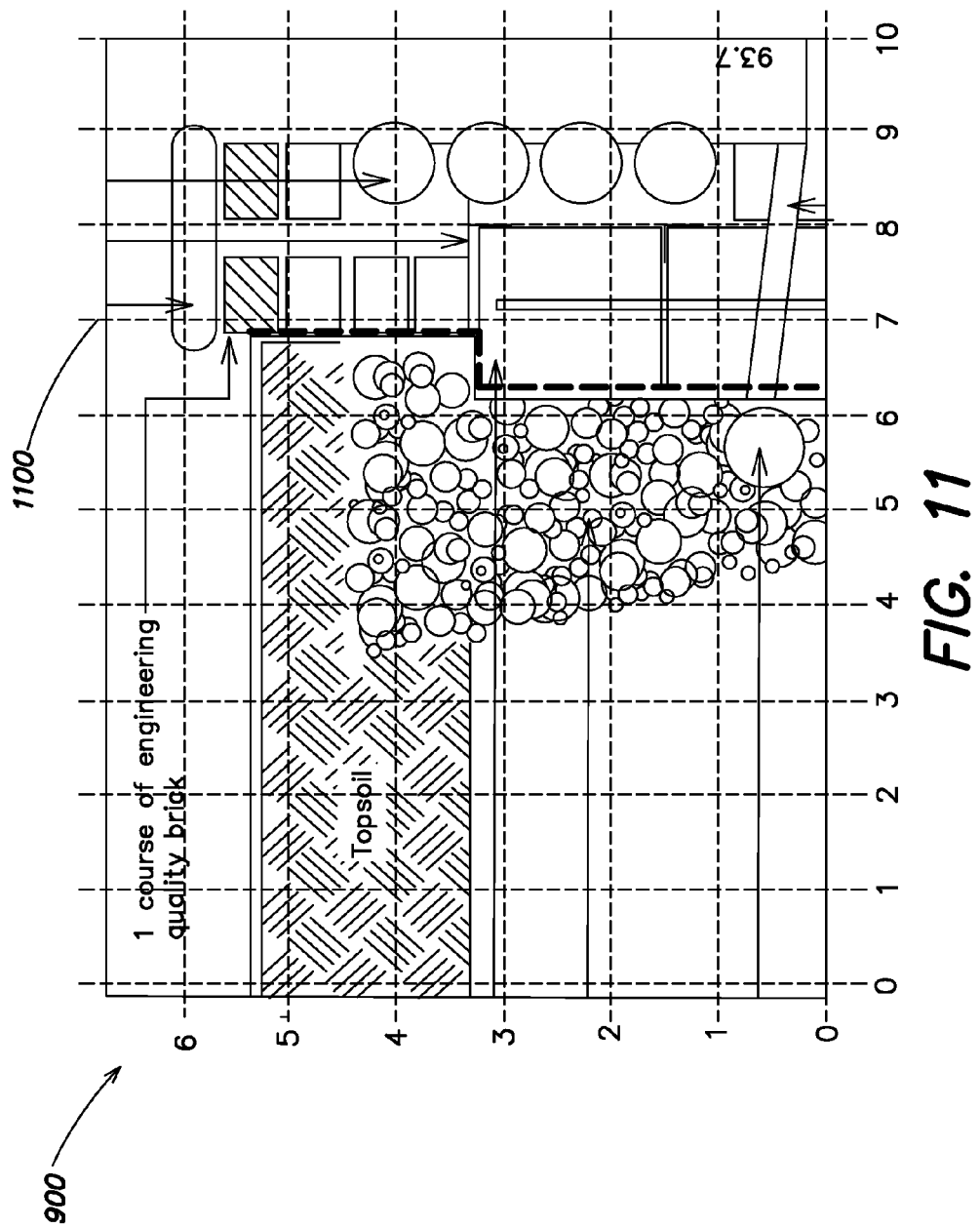
FIG. 11 shows a grid, overlaid on the construction/engineering drawing of FIG. 9, representing an exemplary input image.

In view of the foregoing, various examples of input images and source data representing input images 216 according to the present disclosure, to which the inventive concepts disclosed herein may be applied, include but are not limited to:

Various maps, such as street/road maps (e.g., map 800 of FIG. 8), topographical maps, military maps, parcel maps, tax maps, town and county planning maps, virtual maps, etc. (such maps may or may not include geo-encoded information). Such maps may be scaled to a level appropriate for the application;

Architectural, construction and/or engineering drawings and virtual renditions of a space/geographic area (including "as built" or post-construction drawings). Such drawings/renditions may be useful, e.g., in property damage report applications or for documenting construction, landscaping or maintenance. An exemplary construction/engineering drawing 900 is shown in FIG. 9;

Land surveys, i.e., plots produced at ground level using references to known points such as the center line of a street to plot the metes and bounds and related location data regarding a building, parcel, utility, roadway, or other object or installation. Land survey images may be useful, e.g., in vehicular incident report applications or police report applications. FIG. 10 shows an exemplary land survey map 1000;

A grid (a pattern of horizontal and vertical lines used as a reference) to provide representational geographic information (which may be used "as is" for an input image or as an overlay for an acquired "real world" scene, drawing, map, etc.). An exemplary grid 1100, overlaid on construction/engineering drawing 900, is shown in FIG. 11. It should be appreciated that the grid 1100 may itself serve as the input image (i.e., a "bare" grid), or be used together with another underlying input image;

"Bare" data representing geo-encoded information (geographical data points) and not necessarily derived from an acquired/captured real-world scene (e.g., not pixel information from a digital camera or other digital image acquisition device). Such "bare" data may be nonetheless used to construct a displayed input image, and may be in any of a variety of computer-readable formats, including XML).

One example of bare data is geo-referenced data relating to municipal assets. Databases exist that include geo-location information (e.g., latitude and longitude coordinates) and attribute information (e.g., sign type) for municipal assets such as signs, crash attenuators, parking meters, barricades, and guardrails. Such a database may be used in connection with an asset management system, such as the Infor EAM (Enterprise Asset Management) system by Infor Global Solutions of Alpharetta, Ga., to manage municipal assets. Using bare data relating to municipal assets, a geo-encoded image may be constructed that includes representations of municipal assets at their relative locations. In particular, the attribute information may be used to select a symbol representing the asset in the image, and the geo-location information may be used to determine the placement of the symbol in the image.

Other examples of bare data are geo-referenced data relating to weather and geo-referenced data relating to traffic. Both weather and traffic data are available from various sources in Geographic Information System (GIS) format. For example, a set of points, lines, and/or regions in a spatial database may represent locations or areas having a particular traffic attribute (e.g., heavy traffic, construction, moderate congestion, minor stall, normal speeds) or a particular weather attribute (e.g., heavy snow, rain, hail, fog, lightning, clear skies). The data in the database may be dynamic, such that the points, lines, and/or regions and corresponding attributes change as the traffic and weather conditions change. Using bare data relating to traffic and/or weather, a geo-encoded image may be constructed that includes representations of traffic and/or weather conditions at their relative locations. In particular, the attribute information may be used to select a symbol, pattern, and/or color representing the traffic or weather condition in the image, and the geo-location information may be used to determine the placement of the symbol, pattern and/or color in the image. An example of a source for GIS traffic data is NAVIGATOR, the Georgia Department of Transportation's Intelligent Transportation System (ITS). GIS weather data is available from the National Weather Service (NWS). Such weather data may be provided as shapefiles, which is a format for storing geographic information and associated attribute information. Shapefiles may include information relating to weather warnings (e.g., tornado, severe thunderstorm, and flash flood warnings) and the like.

Figure 12:
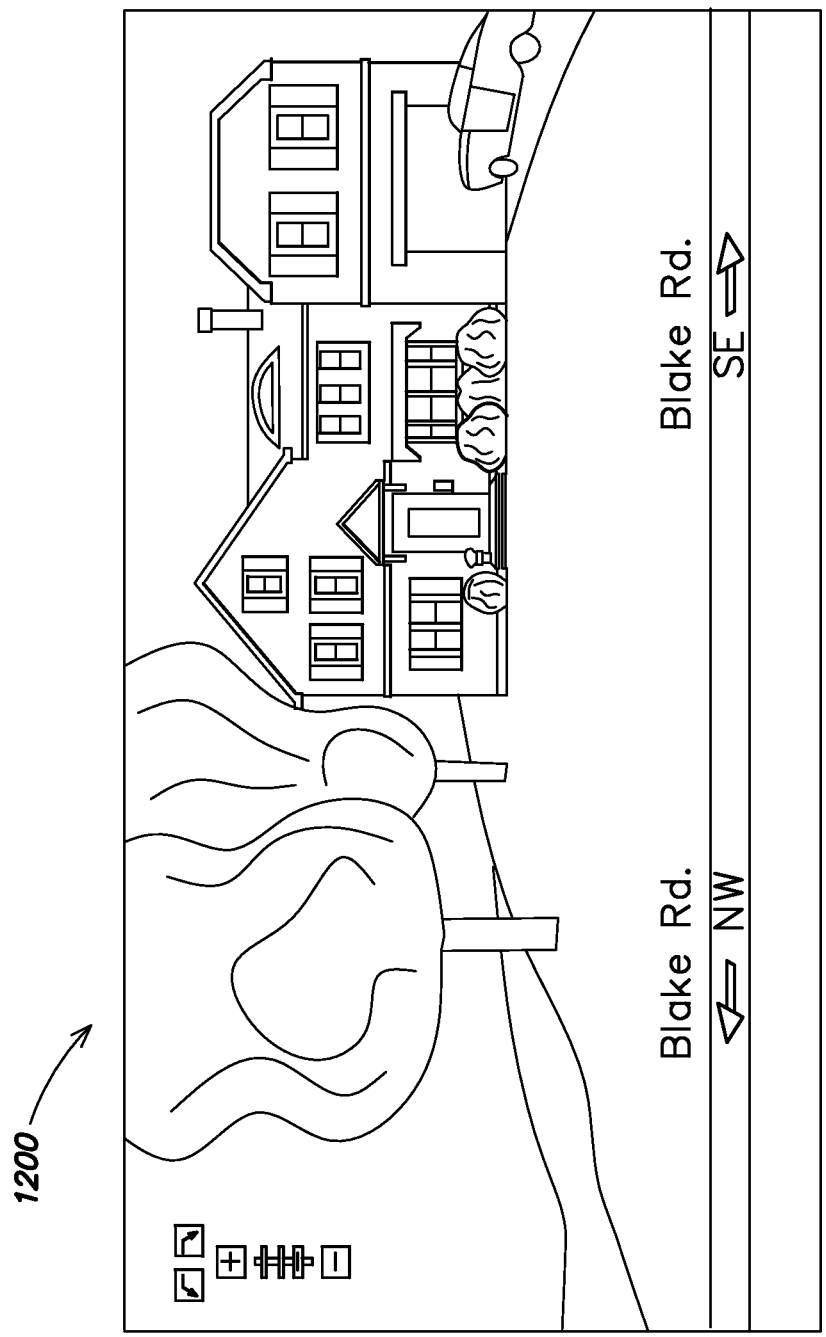
FIG. 12 shows a street level image, representing an exemplary input image.
Figure 15:
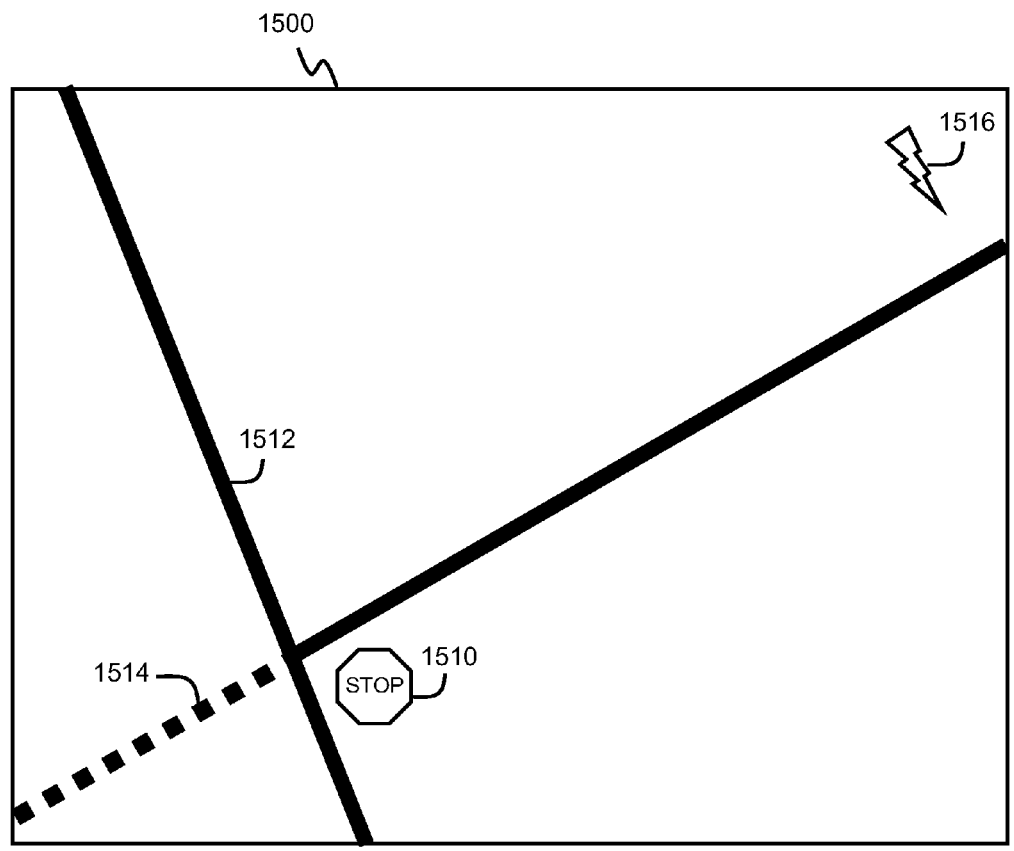
FIG. 15 shows an example of an input image constructed from bare data.

FIG. 15 shows an example of an input image 1500 constructed from bare data. In particular, input image 1500 includes a representation of a street sign 1510, representations of traffic conditions 1512 and 1514, and a representation of a weather condition 1516. The location of the street sign representation 1510 and traffic condition representations 1512 and 1514 may correspond to the actual locations of the street signs and traffic conditions in the region shown in the input image 1500. The location of the representation of the weather condition 1516 may be arbitrarily selected, or selected to be in a corner of the input image 1500, as the representation may indicate that the weather condition corresponds generally to the entire region shown in the input image 1500. Each of the representations shown in FIG. 15 is based on geo-location information (e.g., latitude and longitude coordinates) and attribute information (e.g., a sign type, traffic conditions, and a weather condition). In the example shown, the type of street sign 1510 is a stop sign, the traffic conditions 1512 and 1514 are "construction" and "light traffic," and the weather condition 1516 is lightning; and Photographic renderings/images, including street level (see e.g., street level image 1200 of FIG. 12), topographical, satellite, and aerial photographic renderings/images, any of which may be updated periodically to capture changes in a given geographic area over time (e.g., seasonal changes such as foliage density, which may variably impact the ability to see some aspects of the image). Such photographic renderings/images may be useful, e.g., in connection with preparing property damage reports, vehicular incident reports, police reports, etc.

It should also be appreciated that source data representing an input image 216 may be compiled from multiple data/information sources; for example, any two or more of the examples provided above for input images and source data representing input images 216, or any two or more other data sources, can provide information that can be combined or integrated to form source data that is electronically processed to display an image on a display device.

Figure 3:
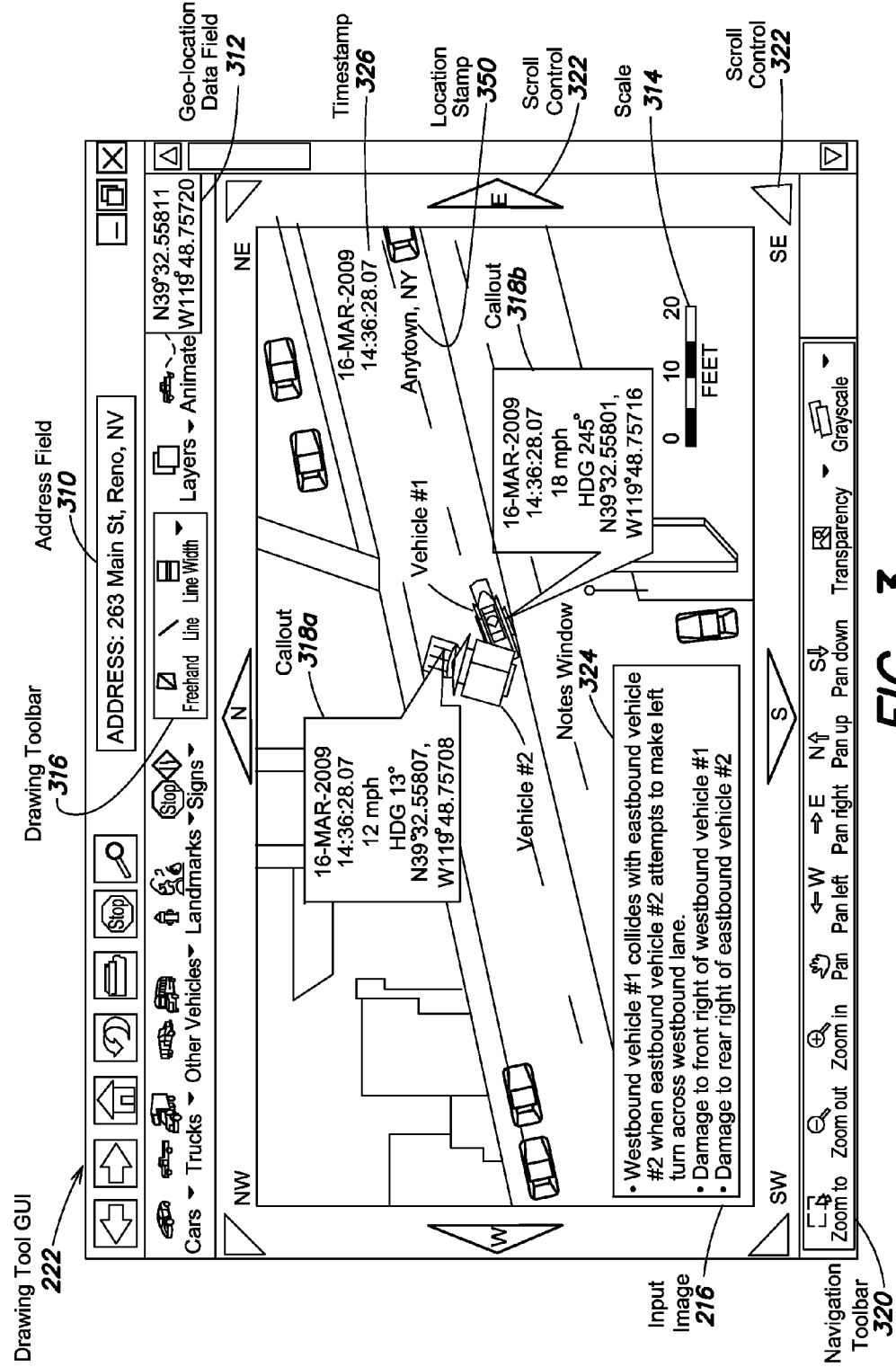
FIG. 3 illustrates an example of a drawing tool GUI of the geo-referenced and/or time-referenced electronic drawing application, according to the present disclosure.

Referring to FIG. 3, an example of a drawing tool GUI of GR and/or TR electronic drawing application 110 is presented. In the case of a web-based application, drawing tool GUI 222 that may be implemented, for example, by a web browser that is presented via any networked computing device. In the case of a standalone application, drawing tool GUI 222 that may be implemented, for example, by a GUI window that is presented via any computing device.

Drawing tool GUI 222 may present a certain input image 216 that corresponds to specified geographic location information. For example, location information from geo-location data 150 may be automatically read into an address field 310 and/or a geo-location data field 312. Alternatively, location information may be manually entered in address field 310 and/or geo-location data field 312. In one example, input image 216 may be an aerial image that corresponds to the geographic location information. Overlaying input image 216 may be an image scale 314. Input image 216 is read into drawing tool GUI 222 and may be oriented in the proper manner with respect to directional heading (i.e., north, south, east, and west).

Drawing tool GUI 222 may also include various palettes, toolbars, or other interfaces that enable the user to manipulate (e.g., zoom in, zoom out) and/or mark up input image 216. For example, drawing tool GUI 222 may include a drawing toolbar 316 that may include a sketching palette as well as a symbols palette. The sketching palette portion of drawing toolbar 316 may provide standard drawing tools that allow a user to draw certain shapes (e.g., a polygon, a rectangle, a circle, a line) atop input image 216. The symbols palette portion of drawing toolbar 316 provides a collection of any symbols that may be useful for depicting the event of interest, such as a vehicle accident. The source of these symbols may be symbols library 214. For example, symbols library 214 may include, but is not limited to, a collection of car symbols, truck symbols, other vehicle symbols (e.g., emergency vehicles, buses, farm equipment, 3-wheel vehicles, etc), landmark symbols (e.g., fire hydrants, trees, fences, poles, various barriers, etc), symbols of signs (e.g., standard road signs, any other signs, etc), symbols of pedestrians, symbols of animals, and the like.

Optionally, the drawing tool GUI 222 may allow a user to specify a confidence level for a selected symbol. For example, if a user selects a symbol corresponding to a bus to be overlaid on input image 216, the user may specify an associated confidence level to indicate a degree of confidence that the observed vehicle was a bus. The confidence level may be numeric, e.g., "25%," or descriptive, e.g., "low." An indication of the confidence level or a degree of uncertainty may be displayed adjacent the corresponding symbol or may be integrated with the symbol itself. For example, a question mark or the confidence level may be displayed on or near the symbol. Additionally or alternatively, an indication of the confidence level may be included in the text of a vehicle accident report including the marked up input image.

By use of the elements of drawing toolbar 316, a user may manually mark up input image 216 in a manner that depicts, for example, the vehicle accident scene. In one example and referring to FIG. 3, a vehicle collision is depicted by a vehicle #1 and a vehicle #2 overlaid on input image 216. The symbols for vehicle #1 and vehicle #2 are selected from the symbols palette portion of drawing toolbar 316. In this example, an event-specific electronic representation of vehicle operations with respect to a two-vehicle collision is manually rendered.

Additionally, data processing algorithm 210 reads VCS data 128, geo-location data 150, media files 154, ES data 152, device data 156, and diagnostic codes 158 of vehicle #1 and vehicle #2 and automatically renders an event-specific electronic representation of vehicle operations with respect to a two-vehicle collision. For example, the year, make, and model of vehicle #1 and vehicle #2 may be automatically determined from the vehicle identification numbers (VIN) thereof and the corresponding vehicle symbols may be automatically selected from symbols library 214. Then, for a certain point in time, the relative and actual positions of vehicle #1 and vehicle #2 are determined from the associated VCS data 128, device data 156, media files 154, and/or diagnostic codes 158 and vehicle #1 and vehicle #2 are automatically mapped to and oriented on the selected input image 216.

Additionally, GR and/or TR electronic drawing application 110 may be designed to automatically render symbols to scale upon the geo-referenced drawing according to the settings of scale 314. This is one example of how GR and/or TR electronic drawing application 110 may provide consistent accuracy to drawings that support incident reports. Further, the presence of a standard symbols library, such as symbols library 214, is one example of how GR and/or TR electronic drawing application 110 provides standardization to drawings that support incident reports.

The GR and/or TR electronic drawing application 110 may be configured to allow the viewing angle or perspective of the input image 216 and/or representations thereon to be changed. For example, a user may switch between an overhead view, a perspective view, and a side view. This may be accomplished by correlating corresponding points in two or more geo-referenced images, for example. A symbol, such as a representation of a vehicle, or other content-related marking added to an image may have three-dimensional data associated therewith to enable the symbol to be viewed from different angles. Thus, while a viewing angle or perspective of an image may change, its content (e.g., a representation of a vehicle accident and its surrounding) may remain the same.

Further, the GR and/or TR electronic drawing application 110 may be configured to allow the input image 216 to be manually or automatically modified. For example, it may be desirable to remove extraneous features, such as cars, from the input image 126. The GR and/or TR electronic drawing application 110 may include shape or object recognition software that allows such features to be identified and/or removed. One example of software capable of recognizing features in an image, such as an aerial image, is ENVI® image processing and analysis software by ITT Corporation of White Plains, N.Y. Exemplary features that may be recognized include vehicles, buildings, roads, bridges, rivers, lakes, and fields. The GR and/or TR electronic drawing application 110 may be configured such that a value indicating a level of confidence that an identified object corresponds to a particular feature may optionally be displayed. Automatically identified features may be automatically modified in the image in some manner. For example, the features may be blurred or colored (e.g., white, black or to resemble a color of one or more pixels adjacent the feature). Additionally, or alternatively, the GR and/or TR electronic drawing application 110 may include drawing tools (e.g., an eraser tool or copy and paste tool), that allow such features to be removed, concealed, or otherwise modified after being visually recognized by a user or automatically recognized by the GR and/or TR electronic drawing application 110 or associated software.

Drawing toolbar 316 may also allow the user to add text boxes that can be used to add textual content to input image 216. In one example, callouts 318 and a notes window 324 may be one mechanism for entering and/or displaying textual information about, in this example, the vehicle collision. Additionally, that source of the textual information in callouts 318 and/or notes window 324 may be automatically generated from information in the associated VCS data 128, device data 156, media files 154, and/or diagnostic codes 158. In one example, textual information that may be automatically populated in a certain callout 318 may be 16-MAR-2009; 14:36:28.07; 18 mpg; heading 245°; N39°32.55801, W119°48.75716; 30% humidity; 73° F.; daylight, and the like.

Further, drawing tool GUI 222 may include a navigation toolbar 320 by which the user may zoom or pan input image 216 (e.g., zoom in, zoom out, zoom to, pan, pan left, pan right, pan up, pan down, etc.). Navigation toolbar 320 may additionally include one or more buttons that enable user drawn shapes to be accentuated (e.g., grayscale, transparency, etc.). Additionally, a set of scroll controls 322 may be provided in the image display window that allows the user to scroll input image 216 north, south, east, west, and so on with respect to real world directional heading.

Overlaying input image 216 may also be a timestamp 326 and/or a location stamp 350. Timestamp 326 may indicate the creation date and/or time of the resulting event-specific image 226 and/or a modification date and/or time of the event-specific image 226. Date and time information of onsite computer 112 (e.g., from a timer device) may be the source of information of timestamp 326. Location stamp 350 may indicate the location (e.g., city and state, zip code and/or geographic coordinates) where the event-specific image 226 was created or modified. Geo-location data relating to the location of onsite computer 112 (e.g., data from a GPS device local to or in the vicinity of the onsite computer) may be the source of information of location stamp 350.

The timestamp 326 and location stamp 350 may be difficult or impossible for a user to modify. Thus, the timestamp and location stamp may be used to verify that at least a portion of the event-specific image 226 with which they are associated was created at an expected time and place, such as the general or specific time and place where the vehicular accident was investigated. If desired, time and/or location data may be automatically acquired several times during the creation of one or more event-specific images 226, and may be stored in association with the images, to enable verification that the user was present at the time and/or place of the investigation for some duration of time.

In some embodiments, the input image data and the mark up data (e.g., the electronic representations of the vehicles, landmarks and/or signs), may be displayed as separate "layers" of the visual rendering, such that a viewer of the visual rendering may turn on and turn off displayed data based on a categorization of the displayed data. Respective layers may be enabled or disabled for display in any of a variety of manners. According to one exemplary implementation shown in FIG. 14, a "layer directory" or "layer legend" pane 1400 may be rendered in the viewing window of drawing tool GUI 222 described in connection with FIG. 2. The layer directory pane 1400 may show all available layers, and allow a viewer to select each available layer to be either displayed or hidden, thus facilitating comparative viewing of layers. The layer directory pane 1400 may be displayed by selecting a "display layer directory pane" action item in the layers menu 1402.

Figure 14:
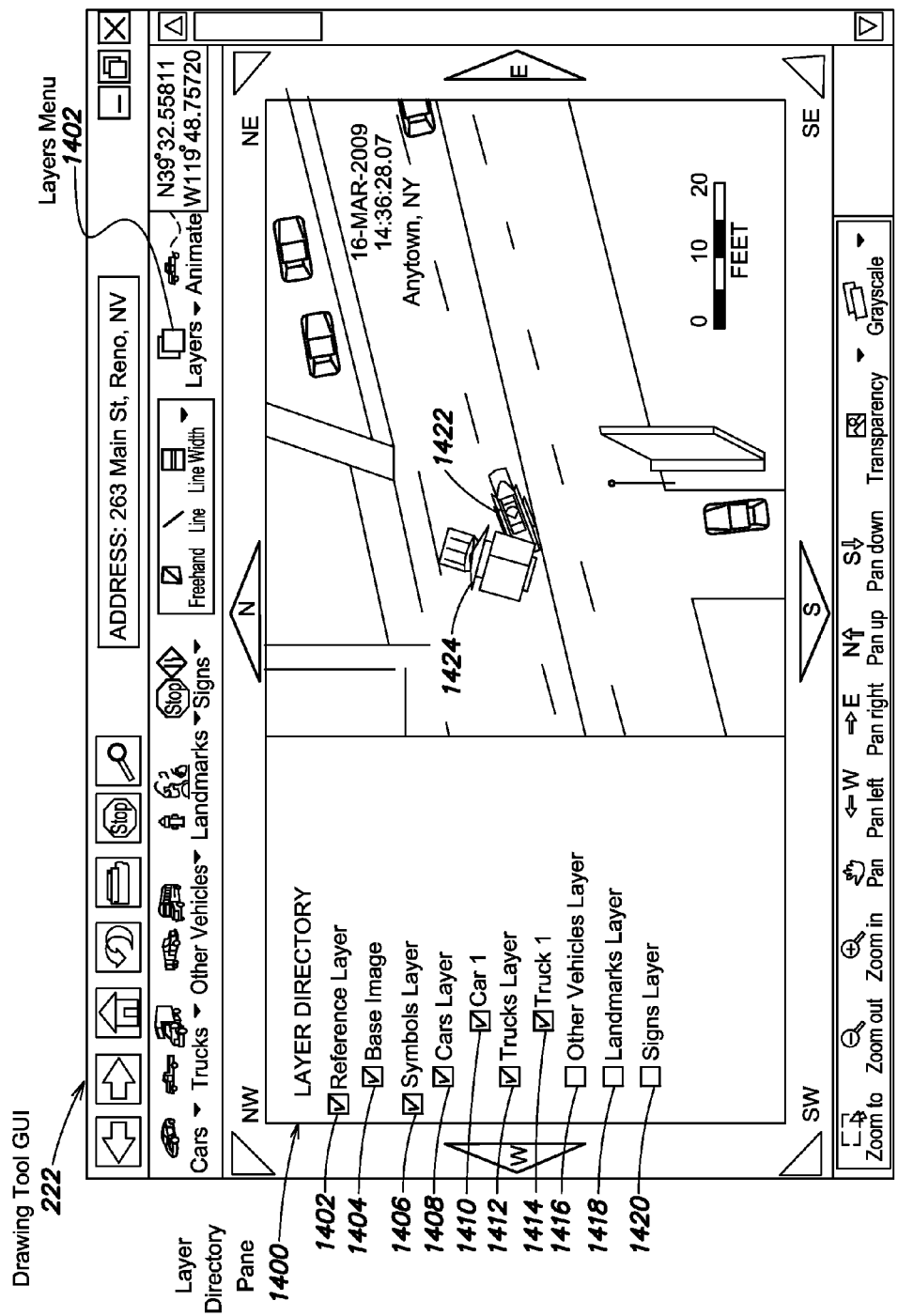
FIG. 14 shows the drawing tool GUI of FIG. 2 displaying a layer directory pane that facilitates the manipulation of layers.

In the example of FIG. 14, image information is categorized generally under layer designation 1402 ("reference layer") and may be independently enabled or disabled for display (e.g., hidden) by selecting the corresponding check box. Similarly, information available to be overlaid on the input image is categorized generally under layer designation 1406 ("symbols layer") and may be independently enabled or disabled for display by selecting the corresponding check box.

The reference layer and symbols layers may have sub-categories for sub-layers, such that each sub-layer may also be selectively enabled or disabled for viewing by a viewer. For example, under the general layer designation 1402 of "reference layer," a "base image" 1404 sub-layer may be selected for display. The base image sub-layer is merely one example of a sub-layer that may be included under the "reference layer," as other sub-layers (e.g., "grid") are possible. Under the general layer designation 1406 of "symbols layer," different symbol types that may be overlaid on the input image may be categorized under different sub-layer designations (e.g., designation 1408 for "cars layer;" designation 1412 for "trucks layer;" designation 1416 for "other vehicles layer;" designation 1418 for "landmarks layer;" and designation 1420 for "signs layer"). In this manner, a viewer may be able to display certain symbols information (e.g., concerning cars and trucks), while hiding other symbols information (e.g., concerning other vehicles, landmarks and signs).

Further, the various sub-layers may have further sub-categories for sub-layers, such that particular features within a sub-layer may also be selectively enabled or disabled for viewing by a viewer. For example, the cars layer may include a designation 1410 for "car 1," and the truck layer may include a designation 1414 for "truck 1." Thus, information concerning the car 1422 ("car 1") and truck 1424 ("truck 1") involved in the accident can be selected for display.

As shown in the example of FIG. 14, both the reference and symbols layers are enabled for display. Under the reference layer, the base image layer is enabled for display. Amongst the symbols layer sub-layers, only the cars layer and the trucks layer are enabled for display. Amongst these sub-layers, the further sub-layers "car 1" and "truck 1" are enabled for display. Accordingly, a base image is rendered in the viewing window of drawing tool GUI 222, and only car 1422 and truck 1424 are rendered thereon.

Virtually any characteristic of the information available for display may serve to categorize the information for purposes of display layers or sub-layers. In particular, any of the various exemplary elements that may be rendered using the drawing tool GUI 222 discussed herein (e.g., timestamps; scales; callouts; estimated time information; input image content; symbols relating to vehicles, landmarks, signs, people, animals or the like, etc.) may be categorized as a sub-layer, and one or more sub-layers may further be categorized into constituent elements for selective display (e.g., as sub-sub-layers). According to one example, a layer may be defined to include only imagery from cameras and/or video devices, with sub-layers corresponding to imagery derived from the cameras and/or video devices of particular vehicles.

Further, layers may be based on user-defined attributes of symbols or other rendered features. For example, a layer may be based on the speed of vehicles, whether vehicles were involved in the accident, whether the vehicles are public service vehicles, the location of vehicles at a particular time, and so on. For example, a user may define particular vehicle symbols as having corresponding speeds, and a "moving vehicles layer" may be selected to enable the display of vehicles having non-zero speeds. Additionally or alternatively, selecting the moving vehicles layer may cause information concerning the speed of the moving vehicles to be displayed. For example, text indicating a speed of 15 mph may be displayed adjacent a corresponding vehicle. Similarly, a user may define particular vehicle symbols as being involved in the accident, and an "accident vehicles layer" may be selected to enable the display of vehicles involved in the accident. Additionally or alternatively, selecting the accident vehicles layer may cause information identifying accident vehicles to be displayed. For example, an icon indicative of an accident vehicle may be displayed adjacent a corresponding vehicle. The "moving vehicles layer" and the "accident vehicles" layer may be sub-layers under the symbols layer, or may be sub-layers under a "vehicle layer" (not shown), which itself is a sub-layer under the symbols layer. Further, the "moving vehicles layer" and the "accident vehicles layer" may in turn include sub-layers. For example, the "moving vehicles layer" may include a sub-layer to enable the display of all vehicles traveling east. From the foregoing, it may be appreciated that a wide variety of information may be categorized in a nested hierarchy of layers, and information included in the layers may be visually rendered, when selected/enabled for display, in a variety of manners.

Other attributes of symbols or other rendered features may also be used as the basis for defining layers. For example, the user-determined and/or automatically determined confidence levels of respective symbols, as discussed herein, may be used as the basis for defining layers. According to one illustrative example, a layer may be defined to include only those symbols that have an associated user-determined and/or automatically determined confidence level of at least some percentage, e.g., 50%. The information concerning the confidence levels associated with the symbols may be drawn from a report in which such levels are included.

It should further be appreciated that, according to various embodiments, the attributes and/or type of visual information displayed as a result of selecting one or more layers or sub-layers is not limited. In particular, visual information corresponding to a selected layer or sub-layer may be electronically rendered in the form of one or more lines or shapes (of various colors, shadings and/or line types), text, graphics (e.g., symbols or icons), and/or images, for example. Likewise, the visual information corresponding to a selected layer or sub-layer may include multiple forms of visual information (one or more of lines, shapes, text, graphics and/or images).

In yet other embodiments, all of the symbols and/or other overlaid information of a particular marked up input image may be categorized as a display layer, such that the overlaid information may be selectively enabled or disabled for display as a display layer. In this manner, a user may conveniently toggle between the display of various related marked up input images (e.g., marked up input images relating to the same accident or other event) for comparative display. In particular, a user may toggle between scenes depicting the events of an accident at different times.

It should be appreciated that a layer need not include a singular category of symbols or overlaid information, and may be customized according to a user's preferences. For example, a user may select particular features in one or more marked up input images that the user would like to enable to be displayed collectively as a layer. Additionally or alternatively, the user may select a plurality of categories of features that the user would like to enable to be displayed collectively as a layer.

In some embodiments, data processing algorithm 210 (FIG. 2) may automatically select which layers are displayed or hidden. As an example, if a user depicts a truck in the accident scene using a truck symbol, data processing algorithm 210 may automatically select the "truck layer" sub-layer and the "truck 1" sub-sub layer for display in the display field. As another example, if a user specifies or selects landmarks to be displayed, data processing algorithm 210 may automatically select the base image to be hidden to provide an uncluttered depiction of an accident scene. The foregoing are merely illustrative examples of automatic selection/enabling of layers, and the inventive concepts discussed herein are not limited in these respects.

The ability to manually and/or automatically render an event-specific electronic representation of vehicle operations with respect to, for example, a vehicle accident using real world geo-referenced images, such as input images 216, is one example of how GR and/or TR electronic drawing application 110 provides improved and consistent accuracy to drawings that support incident reports.

Referring to FIGS. 2 and 3, when the manual and/or automatic rendering of the event-specific electronic representation of, for example, a vehicle accident is completed, the marked up input image 216 may be saved as an event-specific image 226. For example, during the save operation of GR and/or TR electronic drawing application 110, any event-specific images 226 created therein may be converted to any standard digital image file format, such as PDF, JPG, and BMP file format, and saved, for example, in memory 212 or to an associated file system (not shown). In some cases, it may be beneficial for the user and/or data processing algorithm 210 to generate multiple event-specific images 226 in order to depict, for example, more details of how a vehicle accident occurred by depicting the vehicles at different moments in time. The multiple event-specific images 226 may be associated to one another via, for example, respective descriptor files 228 and saved as an image series 230. An example of an image series 230 is shown with reference to FIG. 4.

Each descriptor file 228 includes information about each event-specific image 226 of an image series 230. Using the example of a vehicle accident report, each descriptor file 228 may include the accident report number, the name of the event-specific image 226 with respect to the image series 230, the creation date and time, and the like. Descriptor files 228 provide a mechanism of GR and/or TR electronic drawing application 110 that allow event-specific images 226 and/or any image series 230 to be queried by other applications, such as any incident management applications. In one example, descriptor files 228 may be extensible markup language (XML) files that are created during the save process of event-specific images 226 and/or image series 230.

Referring to FIG. 3, because vehicles may be any year, make, and model, certain vehicles may have limited VCS capability and/or VCS accessibility and may not include certain or any electrical systems 126, GPS navigation system 140, media capture devices 142, environmental sensors 144, and devices 146. Therefore, GR and/or TR electronic drawing application 110 provides the capability for a user 114 to manually create an electronic representation of vehicle operations rendered on a geo-referenced image. In one example, the electronic representation of the operations of both vehicle #1 and vehicle #2 is rendered automatically on the selected input image 216. In another example, the electronic representation of the operations of vehicle #1 is rendered automatically on selected input image 216, while the electronic representation of the operations of vehicle #2 is rendered manually on the selected input image 216. In yet another example, the electronic representation of the operations of both vehicle #1 and vehicle #2 is rendered manually on the selected input image 216.

Figure 4:
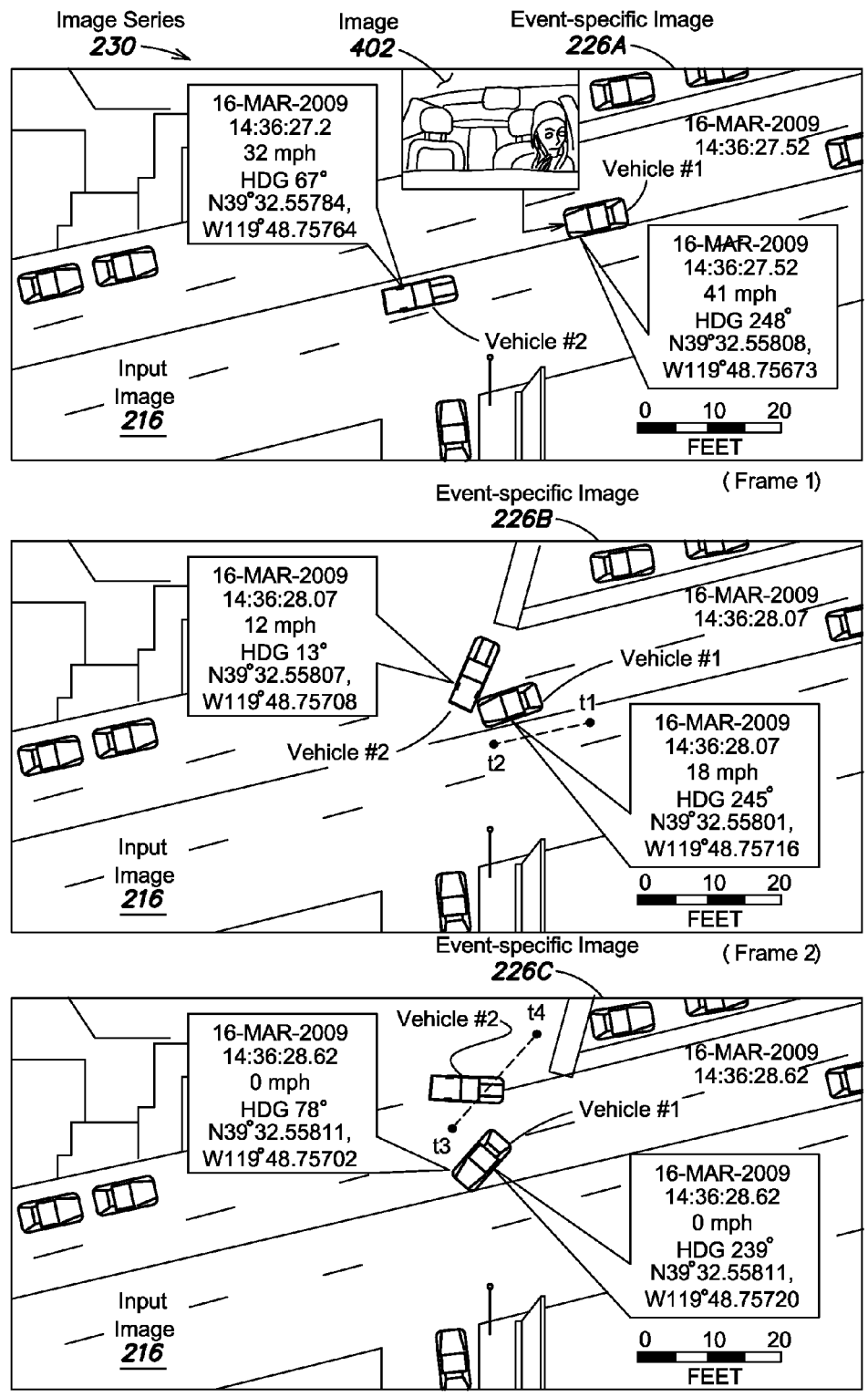
FIG. 4 illustrates an example of a series of geo-referenced and/or time-referenced drawings that are manually and/or automatically generated using the geo-referenced and/or time-referenced electronic drawing application, according to the present disclosure.

Referring to FIG. 4, an example of a series of geo-referenced and/or time-referenced drawings that are manually and/or automatically generated using GR and/or TR electronic drawing application 110 is presented. FIG. 4 shows an example of an image series 230 that depicts time-lapsed sequential images of, for example, a vehicle collision (i.e., essentially representing time-lapsed frames 1, 2, and 3 in sequence). In this example, three records of data from vehicle #1 and vehicle #2 as shown in Tables 2A, 2B, 3A, 3B, 4A, and 4B are analyzed by data processing algorithm 210 to generate multiple event-specific images 226 in order to depict the details of the vehicle accident occurred by depicting the relative and actual positions of both vehicles at three moments in time.

In this example, the timestamp information may reflect the actual time of the vehicle events and may also reflect a relative time from one frame to the next. For example, if frame 2 (event-specific image 226B) indicates the actual moment of impact, frame 1 (event-specific image 226A) may indicate vehicle #1 and vehicle #2 about a half second prior to the moment of impact and frame 3 (event-specific image 226C) may indicate vehicle #1 and vehicle #2 about a half second after the moment of impact.

FIG. 4 also shows an example of graphically depicting certain information of interest that may be provided by VCS 122. In one example, frame 2 (event-specific image 226B) shows a plot of break data with respect to vehicle #1. For example, frame 2 shows that the breaks of vehicle #1 were applied from a time t1 to a time t2. Similarly, frame 3 shows that the breaks of vehicle #2 were applied from a time t3 to a time t4. This breaking information is extracted from, for example, VCS data 128, wherein each record of data in VCS data 128 is timestamped.

Other information of interest may also be graphically depicted on the event-specific images 226. For example, data from a camera and/or video device may be displayed. Such a camera and/or video device may store image data continuously, but may discard data that is not proximate in time to an event of interest (e.g., within 10 seconds of a sudden deceleration). In event-specific image 226A of FIG. 4, an image 402 from a camera and/or video device directed toward the interior of vehicle #1 is displayed in connection with vehicle #1. The image 402 shows the interior and driver of the vehicle at the time of the events depicted in event-specific image 226A. While image 402 shows a view of the interior of the vehicle, a camera and/or video device may also or alternatively be used to capture views of the exterior of the vehicle, such as the views through the windshield and rear window. Further, while an image is only shown in connection with vehicle #1 in event-specific image 226A, it should be appreciated that image data may be continuously acquired for one or both vehicles shown, such that images may be displayed in connection with one or both vehicles in each of event-specific images 226A-C.

The camera and/or video device from which the image data used to generate image 402 is derived may include or be associated with devices that may be used to provide further information relating to acquired image data, For example, a GPS device, a timer or clock device, a compass, an accelerometer and/or a speedometer may be integrated into the camera and/or video device or otherwise associated therewith. For example, such devices may be part of the same vehicle control system. In FIG. 4, image 402 is displayed in connection with an event-specific image that depicts events occurring at the same time that the data corresponding to image 402 was acquired. Data from a timer or clock device may be used to identify a time of image 402. Location data and/or direction information may be used to correlate an image, such as image 402, to a particular geographic location, so that the image or associated features may be displayed in connection with an event-specific image in a location corresponding at least approximately to a location where the data for the image was acquired or a location depicted in the image. In FIG. 4, the arrow associated with image 402 points to a location corresponding to where the image data was acquired. The arrow points in a direction corresponding to a direction in which the camera and/or video device was oriented when the image data was acquired. The location and direction information may be respectively derived from a GPS device and a compass device. Compass data may also be used to orient an overlaid image or an underlying input image to depict an image or scene from a particular point of view (e.g., the point of view of the driver of vehicle #1). Data from an accelerometer and/or a speedometer may be used to determine image data of potential interest for display and/or storage. For example, it may only be desirable to display image data in connection with a vehicle when an event of interest, such a sudden deceleration or stoppage, occurs.

Rather than being directly rendered as an image, image data from a camera and/or video device may be processed to extract information of interest, and such information may be conveyed visually in an event-specific image. For example, image or video data may be processed to extract information concerning a driver's eye movements. A graph, numeric data, or other information relating to the driver's eye movements may be displayed in one or more event-specific images. Such information may additionally or alternatively be integrated into an electronic report of a vehicular incident, such as reports 232 of FIG. 2.

Although the examples above are described in connection with event-specific images 226, which may be static images, it should be appreciated that images, video streams and/or information derived from image data may be displayed in a dynamic manner in connection with a movie style presentation comprising a series of event-specific images 226 or other time-based image data. For example, in a movie style presentation, imagery captured by a video device associated with a vehicle may be displayed in connection with the vehicle at the same rate at which the events involving the vehicle are depicted. Similarly, data derived from imagery captured by a video device (e.g., a stream of data depicting a driver's eye movements) may be displayed at the same rate at which the events involving the vehicle are depicted. As discussed above, data from a GPS device, a timer or clock device, a compass, an accelerometer and/or a speedometer may be used to determine where, when and/or how video data is rendered in connection with a movie style presentation. Further, the above-described movie-style presentation may be interactive such that imagery or other data associated with a vehicle (e.g., a imagery showing the view from the driver's seat) is displayed when a user "mouses over" the vehicle or otherwise indicates a desire to view the imagery or other data.

Tables 2A and 2B show an example of a record of electronic vehicle information of vehicle #1 and vehicle #2, respectively, at a first and substantially same moment in time. In this example, frame 1 of FIG. 4 is represented by an event-specific image 226A that electronically represents the information of Tables 2A and 2B by depicting vehicle #1 heading westbound and vehicle #2 heading eastbound, just prior to the collision.

TABLE 2A

Vehicle #1 record of data at first moment in time

| | |
|---|---|
| VIN (17 characters) | 2005/Chevrolet/Malibu |
| Timestamp data | 16-MAR-2009 14:36:27.52 |
| Speed | 41 mph |
| Throttle position | 31% |
| Break position | 0% |
| Gear | 4 |
| Driver airbag status | Not deployed |
| Passenger airbag status | Not deployed |
| Geo-location data | N39° 32.55808, W119° 48.75673 (deg. and dec. min.) |
| Temperature data | 73 degrees F. |
| Humidity data | 30% |
| Light data | 30 |
| Compass data | 248 degrees |
| Inclinometer data | −0.23 |
| Accelerometer data | +0.036, −0.012, +0.025 (x, y, z) |

TABLE 2B

Vehicle #2 record of data at first moment in time

| | |
|---|---|
| VIN (17 characters) | 2002/Jeep/Comanche |
| Timestamp data | 16-MAR-2009 14:36:27.52 |
| Speed | 32 mph |
| Throttle position | 36% |
| Break position | 0% |
| Gear | 4 |
| Driver airbag status | Not deployed |
| Passenger airbag status | Not deployed |
| Geo-location data | N39° 32.55784, W119° 48.75764 (deg. and dec. min.) |
| Temperature data | 73 degrees F. |
| Humidity data | 30% |
| Light data | 30 |
| Compass data | 67 degrees |
| Inclinometer data | +0.25 |
| Accelerometer data | −0.028, +0.017, +0.015 (x, y, z) |

Tables 3A and 3B show an example of a record of electronic vehicle information of vehicle #1 and vehicle #2, respectively, at a second and substantially same moment in time. In this example, frame 2 of FIG. 4 is represented by an event-specific image 226B that electronically represents the information of Tables 3A and 3B by depicting vehicle #1 and vehicle #2 at the moment of impact during the collision.

TABLE 3A

Vehicle #1 record of data at second moment in time

| | |
|---|---|
| VIN (17 characters) | 2005/Chevrolet/Malibu |
| Timestamp data | 16-MAR-2009 14:36:28.07 |
| Speed | 18 mph |
| Throttle position | 0% |
| Break position | 92% |

TABLE 3A-continued

Vehicle #1 record of data at second moment in time

| | |
|---|---|
| Gear | 2 |
| Driver airbag status | Not deployed |
| Passenger airbag status | Not deployed |
| Geo-location data | N39° 32.55801, W119° 48.75716 (deg. and dec. min.) |
| Temperature data | 73 degrees F. |
| Humidity data | 30% |
| Light data | 30 |
| Compass data | 245 degrees |
| Inclinometer data | −0.23 |
| Accelerometer data | +0.036, −0.237, +0.025 (x, y, z) |

TABLE 3B

Vehicle #2 record of data at second moment in time

| | |
|---|---|
| VIN (17 characters) | 2002/Jeep/Comanche |
| Timestamp data | 16-MAR-2009 14:36:28.07 |
| Speed | 12 mph |
| Throttle position | 12% |
| Break position | 24% |
| Gear | 2 |
| Driver airbag status | Not deployed |
| Passenger airbag status | Not deployed |
| Geo-location data | N39° 32.55807, W119° 48.75708 (deg. and dec. min.) |
| Temperature data | 73 degrees F. |
| Humidity data | 30% |
| Light data | 30 |
| Compass data | 13 degrees |
| Inclinometer data | +0.25 |
| Accelerometer data | −0.153, −0.198, +0.015 (x, y, z) |

Tables 4A and 4B show an example of a record of electronic vehicle information of vehicle #1 and vehicle #2, respectively, at a third and substantially same moment in time. In this example, frame 3 of FIG. 4 is represented by an event-specific image 226C that electronically represents the information of Tables 3A and 3B by depicting the final resting place of vehicle #1 and vehicle #2 after the collision.

TABLE 4A

Vehicle #1 record of data at third moment in time

| | |
|---|---|
| VIN (17 characters) | 2005/Chevrolet/Malibu |
| Timestamp data | 16-MAR-2009 14:36:28.62 |
| Speed | 0 mph |
| Throttle position | 0% |
| Break position | 0% |
| Gear | P |
| Driver airbag status | Not deployed |
| Passenger airbag status | Not deployed |
| Geo-location data | N39° 32.55811, W119° 48.75720 (deg. and dec. min.) |
| Temperature data | 73 degrees F. |
| Humidity data | 30% |
| Light data | 30 |
| Compass data | 239 degrees |
| Inclinometer data | −0.23 |
| Accelerometer data | ±0.000, ±0.000, ±0.000 (x, y, z) |

TABLE 4B

Vehicle #2 record of data at third moment in time

| | |
|---|---|
| VIN (17 characters) | 2002/Jeep/Comanche |
| Timestamp data | 16-MAR-2009 14:36:28.62 |
| Speed | 0 mph |
| Throttle position | 00% |

TABLE 4B-continued

Vehicle #2 record of data at third moment in time

| | |
|---|---|
| Break position | 0% |
| Gear | P |
| Driver airbag status | Not deployed |
| Passenger airbag status | Not deployed |
| Geo-location data | N39° 32.55811, W119° 48.75702 (deg. and dec. min.) |
| Temperature data | 73 degrees F. |
| Humidity data | 30% |
| Light data | 30 |
| Compass data | 78 degrees |
| Inclinometer data | +0.25 |
| Accelerometer data | ±0.000, ±0.000, ±0.000 (x, y, z) |

Referring again to FIG. 4, image series 230, which may be generated from information in Tables 2A, 2B, 3A, 3B, 4A, and 4B, shows a series of event-specific images 226 that represent three instances in time, spaced a fraction of a second apart, such as about a half a second apart. This representation is exemplary only, GR and/or TR electronic drawing application 110 may generate any number of event-specific images 226 from information of one or more vehicles 120 at any instances in time and spaced by any increment in time. In doing so, the electronic representation of vehicle operations may be provided in a slideshow and/or a 2-dimensional and/or 3-dimensional movie style of presentation, which may depict in time-lapsed fashion the actual events leading up to the collision, the actual events at the moment of the collision, and the actual events just after the collision.

Additionally, because input images 216 that are used by GR and/or TR electronic drawing application 110 are geo-referenced and because geo-location data of vehicles 120 is available, other useful information may be determined and graphically indicated on the resulting event-specific images 226. For example, offset distances from landmarks may be automatically calculated. In one example and referring again to FIG. 4, the distance between vehicle #1 and/or vehicle #2 and any landmark, such as the nearest curb, tree, pole, fire hydrant, and/or building, may be calculated and graphically indicated.

Figure 13:
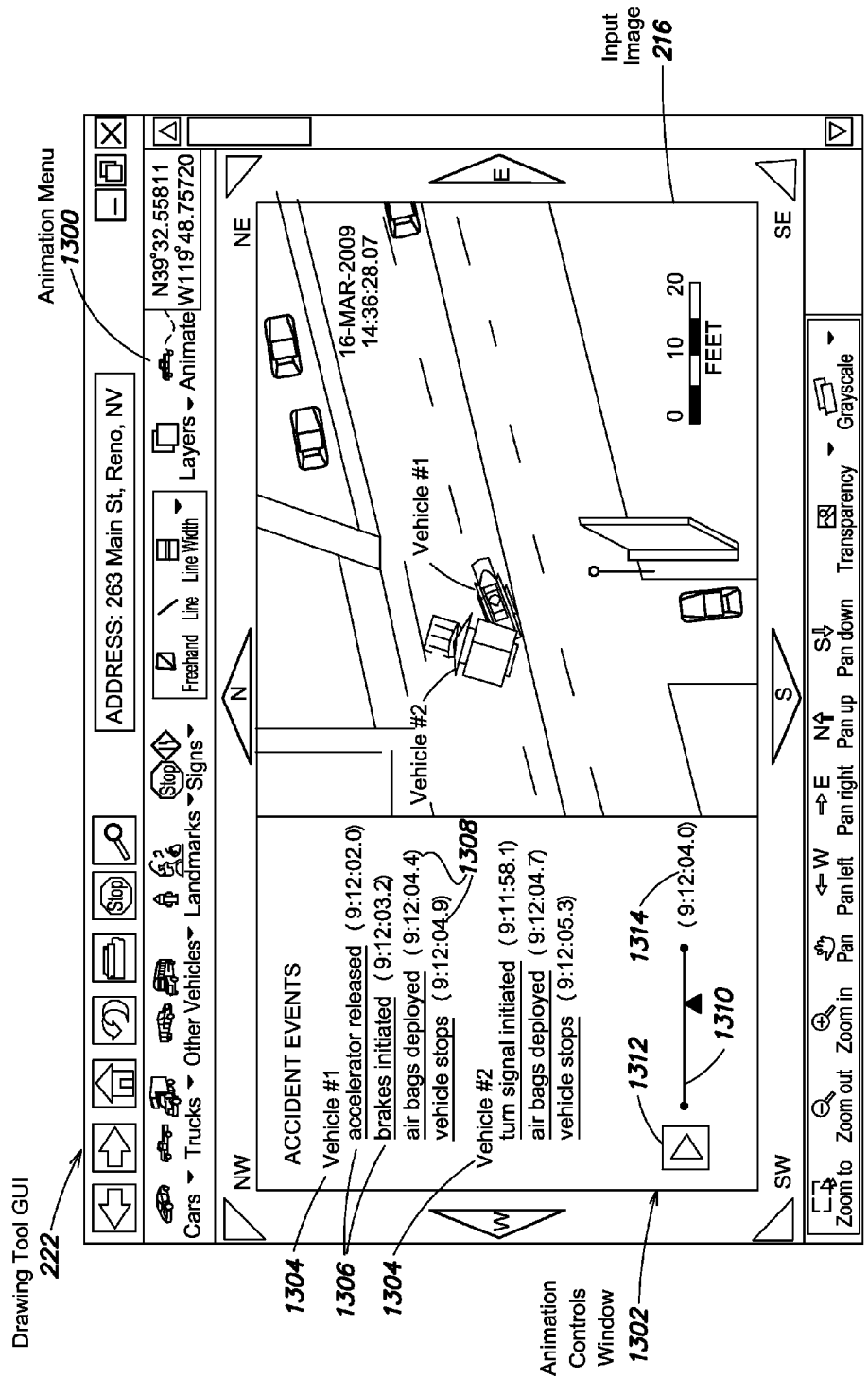
FIG. 13 shows the drawing tool GUI of FIG. 2 displaying an animation controls window that facilitates playback of a movie style of presentation.

In some embodiments, it may be desirable to allow a user to control playback of a movie style of presentation based on a plurality of event-specific images 126. According to one exemplary implementation shown in FIG. 13, an animation controls window 1302 may be rendered in the viewing window of drawing tool GUI 222 described in connection with FIG. 2 to facilitate controlling playback of the presentation. The animation controls window 1302 may be displayed by selecting a "display animation controls" action item in the animation menu 1300.

The animation controls window 1302 comprises a listing of accident events 1306. These events are listed under headings 1304 for the vehicles the events correspond to. A time 1308 associated with each event 1306 is listed next to the event. In addition, the animation controls window 1302 includes a playback location indicator/controller 1310, a playback control button 1312, and a time for the current playback location 1314.

Using the features of animation controls window 1302, the playback of a movie style of presentation based on a plurality of event-specific images 126 may be controlled. A user may pause or play the presentation by selecting the playback control button 1312. The time for the current playback location, as displayed in the viewing window, is displayed as time 1314. If the user would like to view a frame at a particular time, the user can adjust the arrow location on the playback location indicator/controller 1310 to a desired time by sliding the arrow to the left or right. Alternatively, the user may select an accident event 1306 by clicking on underlined text of the event to view the frame at the corresponding time. Each of these actions will cause the viewing window to display a frame at the selected time. To playback the presentation at the selected time, the user may select the playback control button 1312 so that the paused presentation begins playing beginning at the selected time.

In sum, the features shown in animation controls window 1302 represent an exemplary interface for controlling the playback of a movie style of presentation based on a plurality of event-specific images 126. The listing of events 1306, which are linked to specific locations along the playback location indicator/controller 1310, allows a user to quickly access a desired time during an accident event to view the scene at that time or commence playback from that time. Thus, the listing of events 1306 represents an interactive timeline of events for each vehicle. It should be appreciated that many other implementations for such an interactive timeline are possible. For example, the events 1306 may be displayed in spatial relation to the playback location indicator/controller 1310 according to the times 1308 corresponding to the events.

It should be appreciated that the frame rate of the movie style of presentation may be based on a sampling rate of one or more sensors that outputs data used to depict the events in event-specific images 226 or it may be chosen based on other factors. Of course, the sampling rates of different sensors may differ, such that the movement of the animated symbols in the presentation may not be updated with the same frequency. If the movement of one or more symbols is not as smooth as desired, a position of the symbol between updates may be interpolated.

It should also be appreciated that the symbols may be animated to move in real time (i.e., in accordance with actual or estimated time data), or may be animated to move slower or faster than real time. Further, different symbols may be animated in different manners. For example, the symbols of one layer may be animated to move in real time, while the symbols of another layer may be animated to move at speeds slower or faster than their real time speeds, or may remain stationary.

Referring to FIGS. 1, 2, 3, and 4, GR and/or TR electronic drawing application 110 provides a mechanism by which event-specific images 226, an image series 230 and/or a movie style of presentation may be integrated into electronic reports, such as reports 232 of FIG. 2. Reports 232 may be any electronic vehicle accident reports in which geo-referenced electronic drawings may be useful. An example of a report 232 is shown with reference to FIG. 5.

Referring to FIG. 5, a traffic collision report 500 that is generated using GR and/or TR electronic drawing application 110 and that includes an electronic representation of vehicle operations is presented. Traffic collision report 500 is an example of a report 232. Traffic collision report 500 may be, for example, a report used by accident investigation companies, law enforcement agencies, and/or insurance companies.

In this example, a certain event-specific image 226 is read into a drawing field of traffic collision report 500. In this way, the certain event-specific image 226 is integrated into traffic collision report 500. The textual information of traffic collision report 500 may be manually entered and/or automatically imported from information associated with event-specific image 226. For example, a "Description of Accident" field may be populated with textual information of notes window 324 of drawing tool GUI 222 of FIG. 3.

A report 232, such as traffic collision report 500, is not limited to incorporating a single event-specific image 226 only. For example, subsequent pages of traffic collision report 500 may include all event-specific images 226 of a certain image series 230, such as those shown in FIG. 4. Additionally, reports 232 may have one or more media files 154 from vehicle #1 and/or vehicle #2 attached thereto.

The attached media files 154 may be stamped with time, location and/or direction information. For example, a media file 154 may include a timestamp identifying a calendar date and/or time that the media file was created and/or a calendar date and/or time that the media file was stored by VCS 122. Similarly, the media file may include a location stamp identifying a location (e.g., a city and state or geographic coordinates) where the media file was created and/or a location where the media file was stored by VCS 122. A media file may also include a direction stamp specifying directional information associated therewith. For example, if the media file is a photographic image or video that was taken with a camera device associated with a compass, the photographic image or video may be stamped with directional information based on an output of the compass to indicate that the image or video was taken while the camera lens was facing northwest. In certain embodiments, the media files 154 may be automatically stamped with time, location and/or direction information. The timestamp and location stamp, particularly when automatically generated, may be used as verification that the media file was stored at a particular time and place, such as the time and place where the report associated with the media file was created. The direction stamp may be used as verification that the media file was created while a media capture device was facing in a particular direction or otherwise had a particular orientation. The location, time and/or direction data used for the location stamp, timestamp and/or direction stamp may originate from the VCS 122 or any other computing device (e.g., onsite computer 112). For example, the computing device may be GPS-enabled and may include a timer and a compass. Alternatively, the location, time and/or direction data may be based on manual data entry by the user. It should be appreciated that the media file need not be modified to include the location, time and/or direction data described above, as the data may alternatively be stored in association with the media file as distinct data.

As will be discussed herein, the onsite computer 112 shown in FIG. 7 may have a communication interface that may receive information from network 720, which may be a LAN and/or WAN for connecting to the Internet. According to one embodiment, information about an environmental condition may be received as a media file via the communication interface. For example, weather information (e.g., temperature, visibility and precipitation information), traffic information and/or construction information, may be received from the Internet via the communication interface. Such information may be received from a weather service, traffic service, traffic records, construction service or the like. Received information may be attached as files to reports 232. Alternatively, or in addition, received information may incorporated within the reports 232 themselves. For example, if the received information indicates that the weather at the time of an accident was sunny, such information may be automatically input to the traffic collision report 500 discussed in connection with FIG. 5. In particular, the report could include this information as text in a data field, or an event-specific image 226 in the report could include an image of a sun or another icon indicating sunny weather. As another example, if the received information indicates that the visibility at the time of the accident was 20 feet, the report could include this information as text in a data field and/or represent this information in an event-specific image 226. For example, to represent the area that could not be viewed by a particular driver, the area beyond a 20 foot radius of the driver in the event-specific image 226 could be colored gray, blacked out, or designated with hash marks. Alternatively, the traffic collision report 500 could be manually updated to include weather information, traffic information, construction information, or the like. Condition information received via the communication interface may be stored with and/or stamped with location, time and/or direction data indicating when the condition information was stored by the onsite computer 112.

Figure 6:
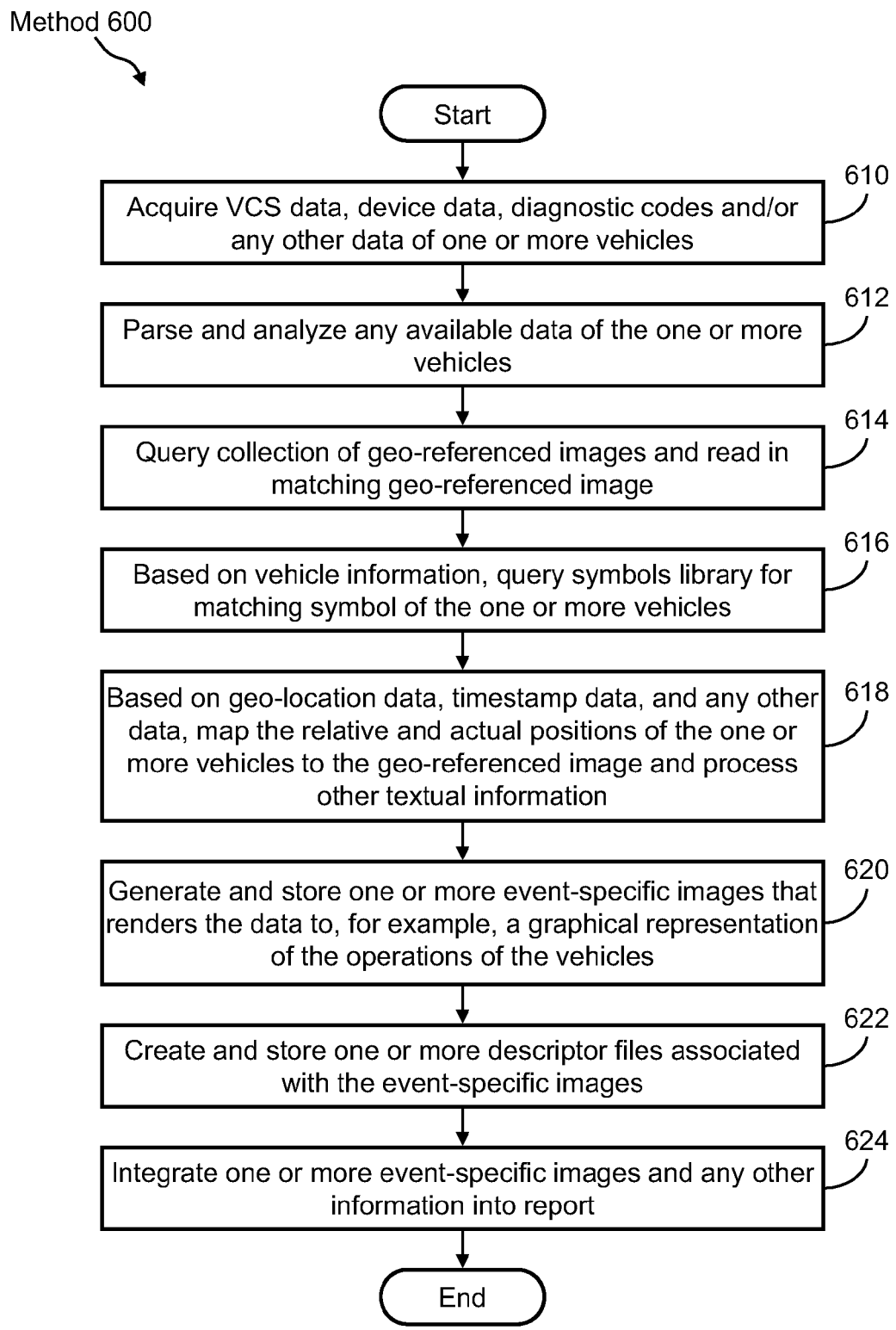
FIG. 6 illustrates a flow diagram of an example of a method of generating an electronic representation of vehicle operations operation using the geo-referenced and/or time-referenced electronic drawing application, according to the present disclosure.

Referring to FIG. 6, a flow diagram of an example of a method 600 of generating an electronic representation of vehicle operations using GR and/or TR electronic drawing application 110 is presented. Method 600 may include, but is not limited to, the following steps, which are not limited to any order.

At step 610, VCS data 128, geo-location data 150, media files 154, ES data 152, device data 156, diagnostic codes 158, and/or any other data of one or more vehicles, such as vehicles 120, is acquired by GR and/or TR electronic drawing application 110. For example, onsite computer 112 and/or OBDII scanner 160 are connected to VCS 122 of one or more vehicles 120 and the VCS data 128, geo-location data 150, media files 154, ES data 152, device data 156, diagnostic codes 158, and/or any other data of the one or more vehicles 120 is accessed and read into GR and/or TR electronic drawing application 110.

At step 612, any available data of one or more vehicles, such as vehicles 120, is parsed and analyzed by GR and/or TR electronic drawing application 110. For example, data processing algorithm 210 of GR and/or TR electronic drawing application 110 organizes VCS data 128, geo-location data 150, media files 154, ES data 152, device data 156, diagnostic codes 158, and/or any other data into one or more records of data, for example, on a time-referenced basis. That is, data processing algorithm 210 may correlate in time the information from two or more vehicles 120 based on timestamp information. For example, records of data are created with respect to substantially matching instances in time, based on timestamp information, for one or more vehicles 120. Example records of data are shown with reference to Tables 2A, 2B, 3A, 3B, 4A, and 4B.

At step 614, the collection of geo-referenced images is queried and the matching geo-referenced image is read into GR and/or TR electronic drawing application 110. For example, data processing algorithm 210 of GR and/or TR electronic drawing application 110 queries input images 216, which are the geo-referenced images, in order to find the input image 216 that substantially matches the location information of geo-location data 150, which is determined at step 612. Once the matching input image 216 is found, the input image 216 is read into GR and/or TR electronic drawing application 110 and may be rendered in the viewing window drawing tool GUI 222. In one example and referring to FIG. 3, an input image 216 that matches "263 Main St, Reno, Nev." (shown in address field 310) is located in the collection of input images 216 in memory 212 and then read into GR and/or TR electronic drawing application 110.

At step 616, based on vehicle information, symbols library 214 is queried for matching symbols of the one or more vehicles, such as vehicles 120. For example, based on information in the VIN in the VCS data 128 of the one or more vehicles 120, vehicle symbols matching the information in the VIN are selected from symbols library 214. More specifically, using the Vehicle Descriptor Section of the VIN, which is the 4th through 9th positions in the 17-character VIN, the year, make, and model of the vehicles 120 of interest may be determined by data processing algorithm 210. In one example and referring to FIG. 3 and/or Tables 2A, 2B, 3A, 3B, 4A, and 4B, it may be determined that vehicle #1 is a 2005 Chevrolet Malibu and that vehicle #2 is a 2002 Jeep Comanche. Therefore, the symbols for a 2005 Chevrolet Malibu and a 2002 Jeep Comanche may be automatically selected from symbols library 214.

At step 618, based on geo-location data, timestamp data, and any other data, the relative and actual positions of the one or more vehicles 120 are mapped to the geo-referenced image that is selected in step 614 and other textual information is processed. For example, based on the GPS data in geo-location data 150; compass data, inclinometer data, and/or accelerometer data in device data 156; and/or any other data of the one or more vehicles 120 their relative and actual positions are mapped to the selected input image 216, such as shown in FIG. 3. Further, other textual information is processed and rendered on the selected input image 216, such as in callouts 318a and 318b and in note window 324. Additionally, by use of drawing tool GUI 222, other markings may be added manually to the selected input image 216 by a user 114.

At step 620, data processing algorithm 210 of GR and/or TR electronic drawing application 110 may generate and save one or more event-specific images 226. In one example when data processing algorithm 210 has completed the automatic rendering of symbols and/or text upon the certain input image 216 and/or when a user 114 has completed marking up (e.g., with lines, shapes, symbols, text, etc.) the certain input image 216, the marked up input image 216 may be saved as an event-specific image 226. Further, during the save operation of GR and/or TR electronic drawing application 110, any event-specific images 226 created therein may be converted to any standard digital image file format, such as PDF, JPG, and BMP file format, and saved.

At step 622, one or more descriptor files 228 that are associated with the event-specific images 226 may be created and stored by, for example, data processing algorithm 210 of GR and/or TR electronic drawing application 110.

At step 624, at least one event-specific image 226 and/or all event-specific images 226 of a certain image series 230 and any other information are integrated into, for example, an electronic accident report. In one example, a certain event-specific image 226 is integrated into a certain report 232, such as traffic collision report 500 of FIG. 5. Further, textual information associated with the event-specific image 226 may be automatically imported into traffic collision report 500. Further, the certain image series 230 that may accompany, for example, traffic collision report 500 may provide an electronic representation of vehicle operations in a slideshow and/or movie style of presentation, which may depict in time-lapsed fashion the events leading up to a vehicle collision, the events at the moment of the collision, and the events just after the collision. Additionally, media files 154 may be provided as attachments to reports 232, such as to traffic collision report 500.

Figure 7:
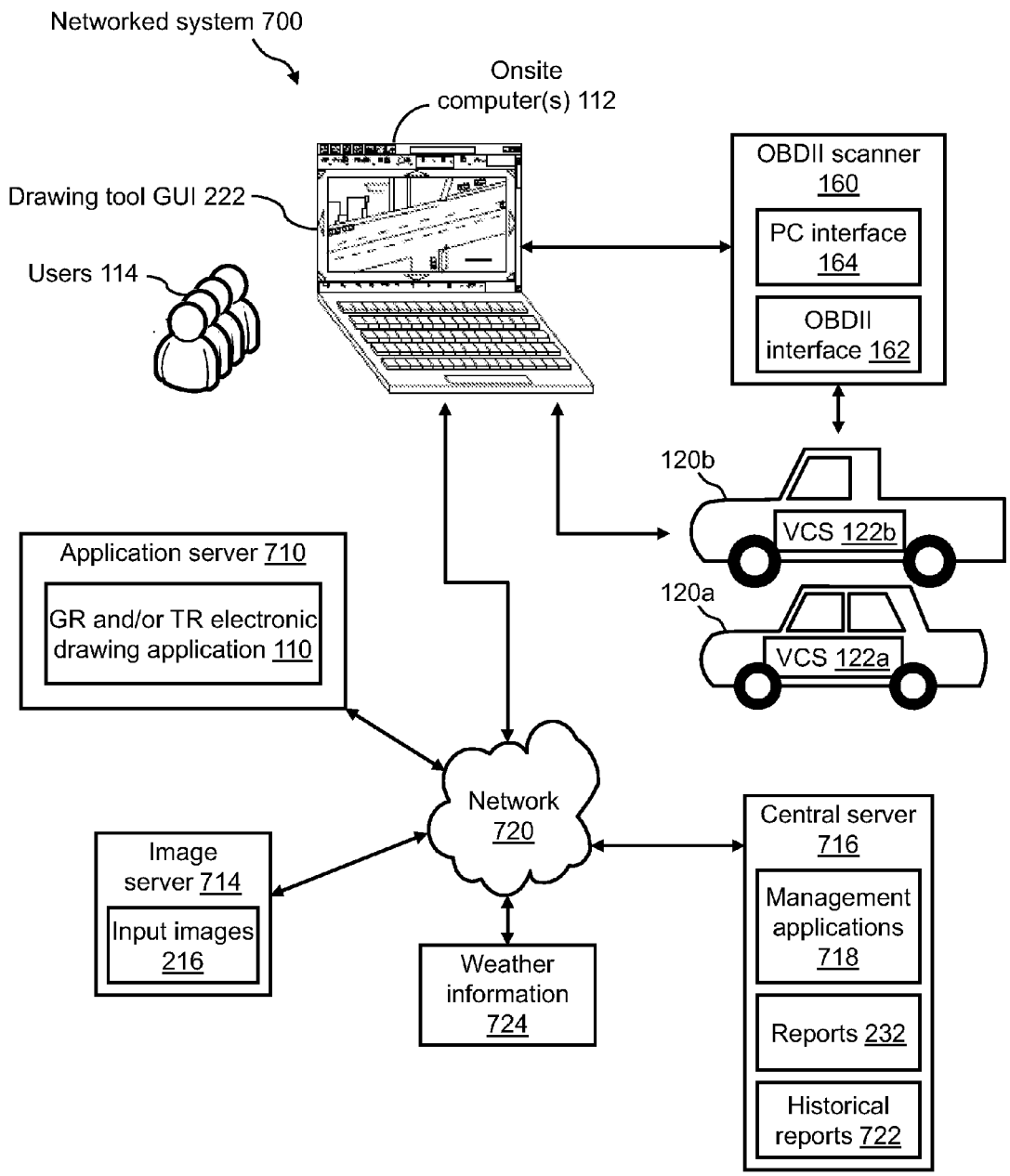
FIG. 7 illustrates a functional block diagram of a networked system that includes the geo-referenced and/or time-referenced electronic drawing application for generating an electronic representation of vehicle operations, according to the present disclosure.

Referring to FIG. 7, a functional block diagram of a networked system 700 that includes GR and/or TR electronic drawing application 110 for generating an electronic representation of vehicle operations is presented. In this embodiment, GR and/or TR electronic drawing application 110 may be a server-based application. Therefore, networked system 700 may include an application server 710 upon which GR and/or TR electronic drawing application 110 is installed.

Application server 710 may be any application server, such as a web application server and/or web portal, by which one or more user 114 may access GR and/or TR electronic drawing application 110 with respect to, for example, generating vehicle accident reports. Application server 710 may be accessed by users 114 via any networked computing device, such as his/her local onsite computer 112. Networked system 700 also shows one or more vehicles 120 and OBDII scanner 160 in communication with onsite computers 112, as described with reference to FIG. 1.

Networked system 700 of the present disclosure may further include an image server 714, which is one example of an entity supplying input images 216 of FIG. 2. Image server 714 may be any computer device for storing and providing input images 216, such as aerial images of geographic locations.

Networked system 700 of the present disclosure may further include a central server 716. In one example, central server 716 may be associated with accident investigation companies, law enforcement agencies, and/or insurance companies. Certain business applications, such as management applications 718, may reside on central server 716. Management applications 718 may be, for example, any incident management applications.

A network 720 provides the communication link between any and/or all entities of networked system 700. For example, network 720 provides the communication network by which information may be exchanged between application server 710, image server 714, central server 716, and onsite computers 112. Network 720 may be, for example, any local area network (LAN) and/or wide area network (WAN) for connecting to the Internet.

In order to connect to network 720, each entity of networked system 700 includes a communication interface (not shown). For example, the respective communication interfaces of application server 710, image server 714, central server 716, and onsite computers 112 may be any wired and/or wireless communication interface by which information may be exchanged. Examples of wired communication interfaces may include, but are not limited to, USB ports, RS232 connectors, RJ45 connectors, Ethernet, and any combinations thereof. Examples of wireless communication interfaces may include, but are not limited to, an Intranet connection, Internet, Bluetooth® technology, Wi-Fi, Wi-Max, IEEE 802.11 technology, RF, IrDA compatible protocols, LAN, WAN, SWAP, any combinations thereof, and other types of wireless networking protocols.

In certain embodiments, central server 716 of networked system 700 may include a collection of historical reports 722, which are records of reports 232 that have been processed in the past. In one example, in the context of vehicle accident reports, historical reports 722 may be useful to inform current reports 232, such as current accident reports that are being processed. For example, being able to review historical information pertaining to a certain intersection may be useful to add to an accident report for fault analysis purposes, as certain trends may become apparent. For example, historical reports 722 may indicate for a certain highway or street intersection that a steep hill is present, the traffic light malfunctions, the line of site to the stop sign is obstructed, there is a poor angle of visibility at the intersection, the intersection is an accident prone area in poor weather conditions (e.g., a bridge approaching the intersection freezes over), and the like.

In certain embodiments, networked system 700 may be used to access other useful information, such as weather information 724, which may be accessed via the Internet. Weather information 724 may be information supplied by a national and/or regional weather service that may be included in reports 232. Referring again to step 624 of method 600 of FIG. 6, information from historical reports 722 and weather information 724 are examples of other information that may be integrated into reports 232.

In operation, each user of networked system 700 may access GR and/or TR electronic drawing application 110 via his/her local onsite computer 112. Networked system 700 may provide a secure login function, which allows users 114 to access the functions of GR and/or TR electronic drawing application 110. Once authorized, users 114 may open drawing tool GUI 222 using, for example, the web browsers of their onsite computers 112. A user 114 connects his/her onsite computer 112 and/or OBDII scanner 160 to each vehicle 120 of interest and collects the VCS data 128, geo-location data 150, media files 154, ES data 152, device data 156, diagnostic codes 158, and/or any other data from one or more vehicles 120. This information may be collected one vehicle at a time. Subsequently, data processing algorithm 210 may synchronize the information from two or more vehicles 120 based on timestamp information.

Subsequently, an electronic representation of the operations of the one or more vehicles 120 is automatically generated by GR and/or TR electronic drawing application 110, as described with reference to FIGS. 1 through 6. Optionally, depending on the VCS capability and/or the presence of electrical systems 126, GPS navigation system 140, media capture devices 142, environmental sensors 144, and devices 146 in the vehicles 120 of interest, the electronic representation of the operations of certain vehicles 120 may be generated manually (in full or in part) by the user 114 using drawing tool GUI 222 of GR and/or TR electronic drawing application 110. The manual generation of the electronic representation may be based on visual observations at the scene and/or descriptions provide by persons involved and/or other witnesses.

In one example, the electronic representation of the operations of the one or more vehicles 120 is useful for supporting vehicle accident reports. In this process, input images 216 of image server 714 may be the source of the geo-referenced images that are read into GR and/or TR electronic drawing application 110. Subsequently, reports 232 that include geo-referenced and/or time-referenced images, such as event-specific images 226, and, optionally, one or more media files 154 attached thereto may be transmitted in electronic form from the onsite computers 112 of users 114 to any entities connected to network 720 of networked system 700. In one example, reports 232 that include geo-referenced and/or time-referenced images may be transmitted in electronic form from the onsite computers 112 of users 114 to central server 716 for further review and processing by authorized users only of networked system 700. This is an example of how GR and/or TR electronic drawing application 110 is used in networked system 700 to provide improved distribution and tracking of reports among entities and to provide improved control over access to reports.

Referring again to FIG. 7, networked system 700 is not limited to the types and numbers of entities that are shown in FIG. 7. Any types and numbers of entities that may be useful in event documenting and reporting systems may be included in networked system 700. Further, in another embodiment, GR and/or TR electronic drawing application 110 may be a standalone application that resides on each networked onsite computer 112. Therefore, in this embodiment, networked system 700 of FIG. 7 need not include application server 710.

In summary and referring to FIGS. 1 through 7, data acquisition system 100 that includes GR and/or TR electronic drawing application 110 of the present disclosure provides an automated way to generate an electronic representation of vehicle operations that is rendered in a time-referenced manner on real world geo-referenced images with symbols, shapes, and/or lines in order to provide improved and consistent accuracy with respect to drawings that support, for example, vehicle incident reports. Additionally, GR and/or TR electronic drawing application 110 has the capability to generate an electronic representation of vehicle operations both automatically (based on actual vehicle data) and manually.

Further, data acquisition system 100 that includes GR and/or TR electronic drawing application 110 provides the ability to electronically mark up real world geo-referenced images with symbols, shapes, and/or lines to scale, again providing improved and consistent accuracy with respect to drawings that support vehicle accident reports.

Further, data acquisition system 100 that includes GR and/or TR electronic drawing application 110 provides a standard symbols library, thereby providing standardization with respect to drawings that support, for example, vehicle accident reports.

Further, data acquisition system 100 that includes GR and/or TR electronic drawing application 110 may provide an electronic representation of vehicle operations that is based on actual vehicle data in a slideshow and/or movie style of presentation, which may depict in time-lapsed fashion, for example, the events leading up to a vehicle collision, the events at the moment of the collision, and the events just after the collision.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

Figure 16:
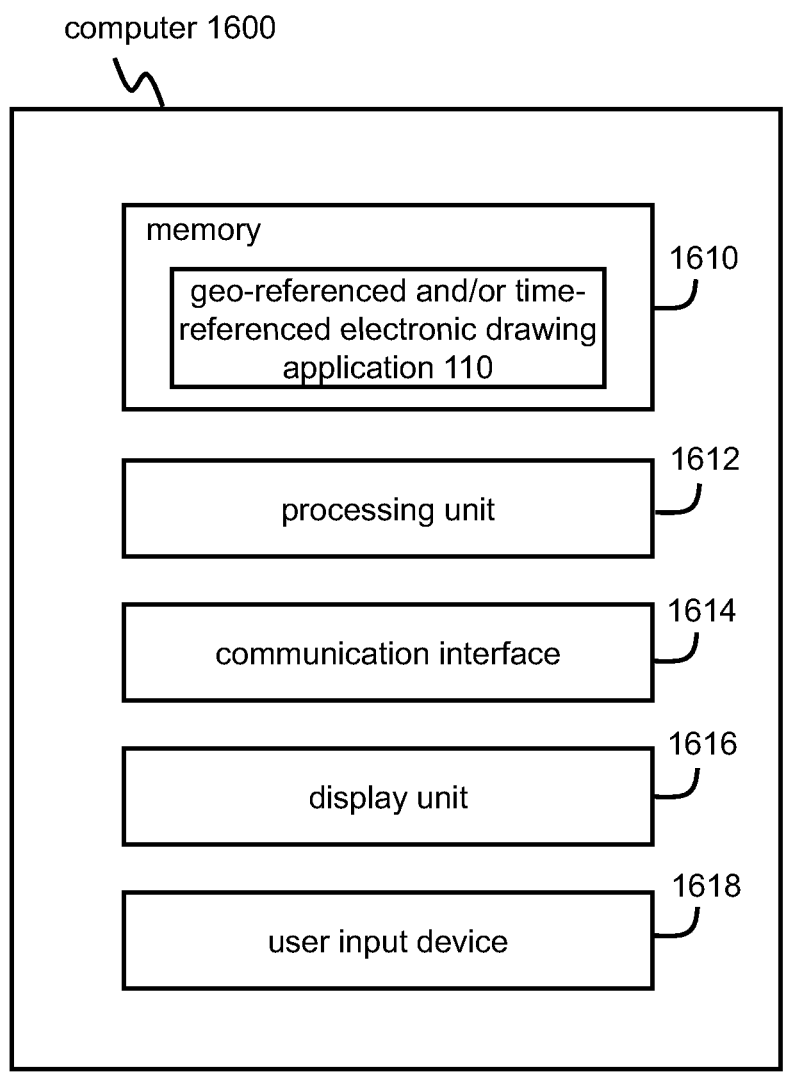
FIG. 16 shows an illustrative computer that may be used at least in part to implement the geo-referenced and/or time-referenced electronic drawing application in accordance with some embodiments.

FIG. 16 shows an illustrative computer 1600 that may be used at least in part to implement the geo-referenced and/or time-referenced electronic drawing application 110 described herein in accordance with some embodiments. For example, the computer 1600 comprises a memory 1610, one or more processing units 1612 (also referred to herein simply as "processors"), one or more communication interfaces 1614, one or more display units 1616, and one or more user input devices 1618. The memory 1610 may comprise any computer-readable media, and may store computer instructions (also referred to herein as "processor-executable instructions") for implementing the various functionalities described herein. The processing unit(s) 1612 may be used to execute the instructions. The communication interface(s) 1614 may be coupled to a wired or wireless network, bus, or other communication means and may therefore allow the computer 1600 to transmit communications to and/or receive communications from other devices. The display unit(s) 1616 may be provided, for example, to allow a user to view various information in connection with execution of the instructions. The user input device(s) 1618 may be provided, for example, to allow the user to make manual adjustments, make selections, enter data or various other information, and/or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus for documenting an incident involving a first vehicle at an incident site, the apparatus comprising:
   a communication interface;
   a memory to store processor-executable instructions; and
   a processing unit communicatively coupled to the communication interface and the memory, wherein upon execution of the processor-executable instructions by the processing unit, the processing unit:
   controls the communication interface to electronically receive at least one input image of a geographic area including the incident area;
   acquires vehicle-based information relating to the first vehicle at a time during or proximate the incident;
   renders, based at least in part on the vehicle-based information, a marked-up image including a first representation of at least a portion of the incident overlaid on the at least one input image; and
   further controls the communication interface and/or the memory to electronically transmit and/or electronically store information relating to the marked-up digital image so as to document the incident with respect to the geographic area.

2. The apparatus of claim 1, wherein the first representation comprises a representation of the first vehicle.

3. The apparatus of claim 2, wherein the processing unit: scales the representation of the first vehicle to a scale of the at least one input image.

4. The apparatus of claim 2, wherein the processing unit: maps the representation of the first vehicle to the at least one input image.

5. The apparatus of claim 4, wherein the processing unit: orients the first vehicle on the at least one input image.

6. The apparatus of claim 1, wherein the processing unit: acquires a media file comprising audio information and/or video information and/or image information generated during or proximate the incident.

7. The apparatus of claim 6, wherein the media file is captured using a media capture device mounted in the first vehicle, and wherein the media capture device is a digital camera, an infra-red camera, or an audio recorder.

8. The apparatus of claim 6, wherein the processing unit acquires the media file from a vehicle control system associated with the first vehicle.

9. The apparatus of claim 1, wherein the input image is geo-referenced.

10. The apparatus of claim 1, further comprising: a display device;
wherein the processing unit controls the display device to display the marked-up digital image.

11. The apparatus of claim 10, further comprising at least one user input device, wherein the processing unit further: categorizes the at least one input image, and/or the first representation of at least a portion of the incident, into a plurality of display layers of the marked-up digital image; controls the display device and/or the at least one user input device so as to provide for independent enabling or disabling for display of at least some display layers of the plurality of display layers; and controls the display device so as to display only enabled display layers of the plurality of display layers.

12. The apparatus of claim 11, wherein the processing unit: categorizes the at least one input image as a reference layer; and categorizes the first representation of at least a portion of the incident as a symbols layer.

13. The apparatus of claim 11, wherein the processing unit further controls the display device and/or the at least one user input device to provide for alternate enabling and disabling for display of at least one display layer of the at least some display layers so as to facilitate a comparative viewing of the at least some display layers.

14. The apparatus of claim 11, wherein the processing unit further: controls the display device so as to display a layer directory or layer legend pane respectively indicating all of the plurality of display layers; and controls the display device and/or the at least one user input device to allowing for selection of at least one display layer of the plurality of display layers indicated in the layer directory or layer legend pane so as to enable or disable for display the selected at least one display layer.

15. The apparatus of claim 11, wherein: at least one display layer of the plurality of display layers includes a plurality of sub-layers; the processing unit categorizes at least some of the at least one input image, and/or at least some of the representation of at least a portion of the incident, into the plurality of sub-layers; the processing unit controls the display device and/or the at least one user input device so as to provide for independent enabling or disabling for display of each sub-layer of the plurality of sub-layers of the at least one display layer; and the processing unit controls the display device so as to display only enabled sub-layers of the plurality of sub-layers so as to provide the electronic rendering of the locate operation and/or the marking operation.

16. The apparatus of claim 10, further comprising: a user input device; wherein the processing unit acquires user input from the user input device to add to the marked-up digital image a second representation of at least a portion of the incident.

17. The apparatus of claim 16, wherein the incident further involves a second vehicle, and wherein the second representation comprises a representation of the second vehicle.

18. The apparatus of claim 1, wherein the processing unit: acquires second vehicle-based information relating to the second vehicle at a time during or proximate the incident; and based at least in part on the second vehicle-based information, adds to the marked-up digital image, a second representation of at least a portion of the incident.

19. The apparatus of claim 1, wherein the processing unit: selects a vehicle symbol corresponding to the first vehicle from a plurality of vehicle symbols in a symbol library; and wherein the first representation comprises the selected vehicle symbol.

20. The apparatus of claim 19, wherein the processing unit: selects the vehicle symbol based on a vehicle identification number of the first vehicle.

21. The apparatus of claim 1, wherein the processing unit: generates a series of images, including the marked-up digital image, wherein the series of images comprises representations of the incident at different sequential times.

22. The apparatus of claim 1, wherein the vehicle-based information relates to an environmental condition in an area proximate to the first vehicle at a time during or proximate the incident.

23. The apparatus of claim 22, wherein the environmental condition comprises a temperature in an area of the first vehicle.

24. The apparatus of claim 22, wherein the environmental condition comprises a humidity in an area of the first vehicle.

25. The apparatus of claim 22, wherein the environmental condition comprises a level of light in an area of the first vehicle.

26. The apparatus of claim 1, wherein the vehicle-based information relates to a physical condition relating to the first vehicle at a time during or proximate the incident.

27. The apparatus of claim 26, wherein the physical condition comprises an acceleration of the first vehicle.

28. The apparatus of claim 26, wherein the physical condition comprises a speed of the first vehicle.

29. The apparatus of claim 26, wherein the physical condition comprises a direction of the first vehicle.

30. The apparatus of claim 26, wherein the physical condition comprises an inclination of the first vehicle.

31. The apparatus of claim 1, wherein the vehicle-based information relates to a position of the first vehicle at a time during or proximate the incident, and wherein the vehicle-based information is geo-location data.

32. The apparatus of claim 1, wherein the processing unit: acquires, from a data acquisition system, the vehicle-based information relating to the first vehicle at a time during or proximate the incident.

33. The apparatus of claim 1, wherein the processing unit: acquires, from the a vehicle control system associated with the first vehicle, a timestamp indicating a time during or proximate the incident.

34. The apparatus of claim 33, wherein the timestamp indicates a time of impact of the first vehicle.

35. The apparatus of claim 1, wherein the processing unit: acquires a media file comprising audio information and/or video information and/or image information generated during or proximate the incident.

36. The apparatus of claim 1, wherein the vehicle-based information relates to a system or device of the first vehicle at a time during or proximate the incident.

37. The apparatus of claim 36, wherein the vehicle-based information comprises an airbag deployment status.

38. The apparatus of claim 36, wherein the vehicle-based information comprises a throttle position or degree.

39. The apparatus of claim 36, wherein the vehicle-based information comprises a brake position or degree.

40. The apparatus of claim 1, wherein the processing unit: generates a descriptor file comprising: information identifying an accident report; and information identifying the marked-up digital image.

41. A method for documenting an incident involving a first vehicle at an incident site, the method comprising:
   A) electronically receiving at least one input image of a geographic area including the incident site;
   B) electronically receiving vehicle-based information relating to the first vehicle at a time during or proximate the incident;
   C) based at least in part on the vehicle-based information received in B), digitally representing, on the at least one input image, a first representation of at least a portion of the incident to thereby generate a marked-up digital image including the first representation; and
   D) electronically transmitting and/or electronically storing information relating to the marked-up digital image so as to document the incident with respect to the geographic area.

42. At least one computer-readable medium encoded with instructions that, when executed by at least one processing unit, perform a method for documenting an incident involving a first vehicle at an incident site, the method comprising:
   A) electronically receiving at least one input image of a geographic area including the incident site;
   B) electronically receiving vehicle-based information relating to the first vehicle at a time during or proximate the incident;
   C) based at least in part on the vehicle-based information received in B), digitally representing, on the at least one input image, a first representation of at least a portion of the incident to thereby generate a marked-up digital image including the first representation; and
   D) electronically transmitting and/or electronically storing information relating to the marked-up digital image so as to document the incident with respect to the geographic area.

43. An apparatus for documenting an incident involving a first vehicle at an incident site, the apparatus comprising:
   a communication interface;
   a memory to store processor-executable instructions; and
   a processing unit communicatively coupled to the communication interface and the memory, wherein upon execution of the processor-executable instructions by the processing unit, the processing unit:
   controls the communication interface to electronically receive source data representing at least two input images of a geographic area comprising the incident area;
   acquires vehicle-based information relating to the first vehicle at a time during or proximate the incident;
   renders, based at least in part on the vehicle-based information, a slideshow or a movie presentation, wherein the slideshow or movie presentation comprises at least two marked-up digital images, comprising:
   (i) a first marked-up digital image comprising a first representation of at least a first portion of the incident overlaid on at least one of the at least two input images; and
   (ii) a second marked-up digital image comprising a second representation of at least a second portion of the incident that is different from the first portion of the incident and is overlaid on another of the at least two input images; and
   further controls the communication interface and/or the memory to electronically transmit and/or electronically store the slideshow or movie presentation so as to document the incident with respect to the geographic area.

44. The apparatus of claim 43, wherein the first vehicle-based information is acquired from a vehicle control system associated with the first vehicle.

45. The apparatus of claim 43, wherein the first representation comprises a representation of the first vehicle.

46. The apparatus of claim 45, wherein the processing unit: scales the representation of the first vehicle to a scale of the at least one input image.

47. The apparatus of claim 45, wherein the processing unit: maps the representation of the first vehicle to the at least one input image.

48. The apparatus of claim 47, wherein the processing unit: orients the first vehicle on the at least one input image.

49. The apparatus of claim 43, wherein the input image is geo-referenced.

50. The apparatus of claim 43, further comprising: a display device; wherein the processing unit controls the display device to display the slideshow or movie presentation.

51. The apparatus of claim 50, wherein the processing unit further:
   controls the display device to display an animation control window; and
   based on user input at a portion of the animation control window, controls a rate of display and/or a content of display of the slideshow or the movie presentation.

52. The apparatus of claim 50, further comprising at least one user input device, wherein the processing unit further:
   categorizes the source data representing each of the at least two input images, the first representation of the at least first portion of the incident, and/or the second representation of the at least second portion of the incident, into a plurality of display layers of the slideshow or the movie presentation;
   controls the display device and/or the at least one user input device so as to provide for independent enabling or disabling for display of at least some display layers of the plurality of display layers; and
   controls the display device so as to display only enabled display layers of the plurality of display layers.

53. The apparatus of claim 52, wherein the processing unit: assigns a confidence level to at least one display layer based on user input at the least one user input device; and controls the display device so as to display only display layers of the plurality of display layers having a confidence level above a threshold value.

54. The apparatus of claim 52, wherein the processing unit: categorizes the source data representing at least one of the at least two input images as a reference layer; and categorizes the first representation of at least a portion of the incident as a symbols layer.

55. The apparatus of claim 52, wherein the processing unit further controls the display device and/or the at least one user input device to provide for alternate enabling and disabling for display of at least one display layer of the at least some display layers so as to facilitate a comparative viewing of the at least some display layers.

56. The apparatus of claim 52, wherein the processing unit further: controls the display device so as to display a layer directory or layer legend pane respectively indicating all of the plurality of display layers; and controls the display device and/or the at least one user input device to allowing for selection of at least one display layer of the plurality of display layers indicated in the layer directory or layer legend pane so as to enable or disable for display the selected at least one display layer.

57. The apparatus of claim 52, wherein: at least one display layer of the plurality of display layers comprises a plurality of sub-layers; the processing unit categorizes at least some of the source data representing the at least one input image, and/or at least some of the representation of at least a portion of the incident, into the plurality of sub-layers; the processing unit controls the display device and/or the at least one user input device so as to provide for independent enabling or disabling for display of each sub-layer of the plurality of sub-layers of the at least one display layer; and the processing unit controls the display device so as to display only enabled sub-layers of the plurality of sub-layers so as to provide the electronic rendering of the locate operation and/or the marking operation.

58. The apparatus of claim 50, further comprising: a user input device; wherein the processing unit acquires user input from the user input device to add to the first marked-up digital image and/or the second marked-up digital image a third representation of at least a portion of the incident.

59. The apparatus of claim 58, wherein the incident further involves a second vehicle, and wherein the third representation comprises a representation of the second vehicle.

60. The apparatus of claim 43, wherein the processing unit: acquires second vehicle-based information relating to the second vehicle at a time during or proximate the incident; and based at least in part on the second vehicle-based information, adds to the first marked-up digital image and/or the second marked-up digital image, a third representation of at least a portion of the incident.

61. The apparatus of claim 60, wherein the second vehicle-based information is acquired from a vehicle control system associated with the second vehicle.

62. The apparatus of claim 43, wherein the processing unit: selects a vehicle symbol corresponding to the first vehicle from a plurality of vehicle symbols in a symbol library; and wherein the first representation comprises the selected vehicle symbol.

63. The apparatus of claim 62, wherein the processing unit: selects the vehicle symbol based on a vehicle identification number of the first vehicle.

64. The apparatus of claim 43, wherein the processing unit: generates the slideshow or movie presentation based on a series of images, comprising the first marked-up digital image and the second marked-up digital image, wherein the series of images comprises representations of the incident at different sequential times.

65. The apparatus of claim 43, wherein the vehicle-based information relates to a condition of the first vehicle at a time during or proximate the incident.

66. The apparatus of claim 65, wherein the condition is an environmental condition.

67. The apparatus of claim 66, wherein the environmental condition comprises a temperature in an area of the first vehicle.

68. The apparatus of claim 66, wherein the environmental condition comprises a humidity in an area of the first vehicle.

69. The apparatus of claim 66, wherein the environmental condition comprises a level of light in an area of the first vehicle.

70. The apparatus of claim 65, wherein the condition is a physical condition.

71. The apparatus of claim 70, wherein the physical condition comprises an acceleration of the first vehicle.

72. The apparatus of claim 70, wherein the physical condition comprises a speed of the first vehicle.

73. The apparatus of claim 70, wherein the physical condition comprises a direction of the first vehicle.

74. The apparatus of claim 70, wherein the physical condition comprises an inclination of the first vehicle.

75. The apparatus of claim 43, further comprising a display device; wherein the processing unit: correlates points in each image of the slideshow or movie presentation that correspond to a common content feature; and controls the display device to display at least one of the at least two input images, the first marked-up digital image, and/or the second marked-up digital image from different viewing angles or from different perspectives.

76. The apparatus of claim 75, wherein the common content feature is a symbol or other content-related marking added to generate the first marked-up digital image and/or the second marked-up digital image.

77. The apparatus of claim 43, wherein the vehicle-based information relates to a position of the first vehicle at a time during or proximate the incident.

78. The apparatus of claim 77, wherein the vehicle-based information is geo-location data.

79. The apparatus of claim 43, wherein the processing unit: acquires, from the vehicle control system, a timestamp indicating a time during or proximate the incident.

80. The apparatus of claim 79, wherein the timestamp indicates a time of impact of the first vehicle.

81. The apparatus of claim 43, wherein the processing unit: acquires, from the vehicle control system, a media file comprising audio information and/or video information and/or image information generated during or proximate the incident.

82. The apparatus of claim 81, wherein the media file is captured using a media capture device mounted in the first vehicle, and wherein the media capture device is a digital camera, an infra-red camera, or an audio recorder.

83. The apparatus of claim 43, wherein the vehicle-based information relates to a system or device of the first vehicle at a time during or proximate the incident.

84. The apparatus of claim 83, wherein the vehicle-based information comprises an airbag deployment status.

85. The apparatus of claim 83, wherein the vehicle-based information comprises a throttle position or degree.

86. The apparatus of claim 83, wherein the vehicle-based information comprises a brake position or degree.

87. The apparatus of claim 43, wherein the processing unit: generates a descriptor file comprising: information identifying an accident report; and information identifying the first marked-up digital image and/or the second marked-up digital image.

88. A method for documenting an incident involving a first vehicle at an incident site, the method comprising:

A) electronically receiving source data representing at least two input images of a geographic area comprising the incident site;
B) electronically receiving, from a vehicle control system associated with the first vehicle, vehicle-based information relating to the first vehicle at a time during or proximate the incident;
C) based at least in part on the vehicle-based information received in B), digitally representing, on the at least one of the at least two input images, a first representation of at least a first portion of the incident, to thereby generate a first marked-up digital image comprising the first representation;
D) based at least in part on the vehicle-based information received in B), digitally representing, on another of the at least two input images, a second representation of at least a second portion of the incident that is different from the first portion of the incident, to thereby generate a second marked-up digital image comprising the second representation;
E) rendering a slideshow or a movie presentation comprising the first marked-up digital image and the second marked-up digital image; and
F) electronically transmitting and/or electronically storing information relating to the slideshow or movie presentation so as to document the incident with respect to the geographic area.

89. At least one computer-readable medium encoded with instructions that, when executed by at least one processing unit, perform a method for documenting an incident involving a first vehicle at an incident site, the method comprising:
A) electronically receiving source data representing at least two input images of a geographic area comprising the incident site;
B) electronically receiving, from a vehicle control system associated with the first vehicle, vehicle-based information relating to the first vehicle at a time during or proximate the incident;
C) based at least in part on the vehicle-based information received in B), digitally representing, on the at least one of the at least two input images, a first representation of at least a first portion of the incident, to thereby generate a first marked-up digital image comprising the first representation;
D) based at least in part on the vehicle-based information received in B), digitally representing, on another of the at least two input images, a second representation of at least a second portion of the incident that is different from the first portion of the incident, to thereby generate a second marked-up digital image comprising the second representation;
E) rendering a slideshow or a movie presentation comprising the first marked-up digital image and the second marked-up digital image; and
F) electronically transmitting and/or electronically storing information relating to the slideshow or movie presentation so as to document the incident with respect to the geographic area.

* * * * *